(12) United States Patent
Zhang

(10) Patent No.: US 11,196,932 B2
(45) Date of Patent: Dec. 7, 2021

(54) METHOD AND APPARATUS FOR CONTROLLING TERMINAL, AND MOBILE TERMINAL FOR DETERMINING WHETHER CAMERA ASSEMBLY SUPPORTED FUNCTIONALITY IS REQUIRED

(71) Applicant: GUANGDONG OPPO MOBILE TELECOMMUNICATIONS CORP., LTD., Guangdong (CN)

(72) Inventor: Cheng Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/172,796

(22) Filed: Feb. 10, 2021

(65) Prior Publication Data

US 2021/0168299 A1    Jun. 3, 2021

Related U.S. Application Data

(63) Continuation of application No. PCT/CN2019/096839, filed on Jul. 19, 2019.

(30) Foreign Application Priority Data

Aug. 22, 2018 (CN) .......................... 201810961791.2

(51) Int. Cl.
*H04N 5/232* (2006.01)
*H04N 5/225* (2006.01)
*H04N 5/247* (2006.01)

(52) U.S. Cl.
CPC ..... *H04N 5/232935* (2018.08); *H04N 5/2257* (2013.01); *H04N 5/247* (2013.01)

(58) Field of Classification Search
CPC ...................................................... H04N 5/247
See application file for complete search history.

(56) References Cited

U.S. PATENT DOCUMENTS

| 2012/0324481 A1 | 12/2012 | Xia et al. | |
|---|---|---|---|
| 2015/0189175 A1* | 7/2015 | Fan | H04N 5/2251 348/37 |
| 2015/0333973 A1* | 11/2015 | Boccardi | G06F 9/547 715/740 |

FOREIGN PATENT DOCUMENTS

| CN | 105224350 A | 1/2016 |
|---|---|---|
| CN | 105939416 A | 9/2016 |

(Continued)

OTHER PUBLICATIONS

International Search Report with English Translation of International application No. PCT/CN2019/096839, dated Oct. 8, 2019 (13 pages).

(Continued)

*Primary Examiner* — Gary C Vieaux
(74) *Attorney, Agent, or Firm* — Young Basile Hanlon & MacFarlane, P.C.

(57) ABSTRACT

A control method is applied in the mobile terminal. The mobile terminal includes a terminal body and a camera assembly, the camera assembly is disposed inside the terminal body and is movable relative to the terminal body to move out of the terminal body. The mobile terminal displays a first interface, acquires interface information of the first interface; determines a second interface based on the interface information of the first interface, wherein the second interface is a next interface following the first interface and forecasted by the mobile terminal; determines whether a function supported by the second interface requires the camera assembly to be activated; and controls the camera assembly to move out of the terminal body in response to the (Continued)

function supported by the second interface requiring the camera assembly to be activated.

20 Claims, 16 Drawing Sheets

(56) References Cited

FOREIGN PATENT DOCUMENTS

| | | | |
|---|---|---|---|
| CN | 106919313 | A | 7/2017 |
| CN | 107105156 | A | 8/2017 |
| CN | 107818251 | A | 3/2018 |
| CN | 207304636 | U | 5/2018 |
| CN | 108205451 | A | 6/2018 |
| CN | 109067944 | A | 12/2018 |
| EP | 2945066 | A2 | 11/2015 |

OTHER PUBLICATIONS

First Office Action with English Translation from China patent office in a counterpart Chinese patent Application 201810961791.2, dated Sep. 12, 2019 (17 pages).

Second Office Action with English Translation from China patent office in a counterpart Chinese patent Application 201810961791.2, dated Feb. 24, 2020 (18 pages).

Notification to Grant Patent Right for Invention with English Translation of Chinese patent Application 201810961791.2, dated Jun. 17, 2020 (6 pages).

* cited by examiner

METHOD AND APPARATUS FOR CONTROLLING TERMINAL, AND MOBILE TERMINAL FOR DETERMINING WHETHER CAMERA ASSEMBLY SUPPORTED FUNCTIONALITY IS REQUIRED

CROSS-REFERENCE TO RELATED APPLICATION(S)

The present application is a continuation-application of International (PCT) Patent Application No. PCT/CN2019/096839 filed on Jul. 19, 2019, which claims priority of Chinese Patent Application No. 201810961791.2, filed on Aug. 22, 2018, the entire contents of both of which are hereby incorporated by reference in their entireties.

TECHNICAL FIELD

The present disclosure relates to the field of mobile terminals, and in particular to a method for controlling a terminal, an apparatus for controlling a terminal, and a mobile terminal.

BACKGROUND

With the development of science and technology, mobile terminals are used more and more widely and have an increasing number of functions. Mobile terminals have become one of necessary electronic products in people's daily life. In addition, users may use cameras of the mobile terminals to photograph, scan, and so on.

SUMMARY

According to a first aspect of the present disclosure, a control method is provided and applied in a mobile terminal. The mobile terminal includes a terminal body and a camera assembly, the camera assembly is disposed inside the terminal body and is movable relative to the terminal body to move out of the terminal body. The method includes: displaying, by the mobile terminal, a first interface, and acquiring interface information of the first interface; determining a second interface based on the interface information of the first interface, wherein the second interface is a next interface following the first interface and forecasted by the mobile terminal; determining whether a function supported by the second interface requires the camera assembly to be activated; and controlling the camera assembly to move out of the terminal body in response to the function supported by the second interface requiring the camera assembly to be activated.

According to a second aspect of the present disclosure, a control apparatus applied in a mobile terminal. The mobile terminal includes a terminal body and a camera assembly, the camera assembly is disposed inside the terminal body and is movable relative to the terminal body to be exposed out of the terminal body. The apparatus includes: an acquisition module, configured for the mobile terminal to display a first interface, and acquire interface information of the first interface; a first determination module, configured to determine a second interface based on the interface information of the first interface, wherein the second interface is a next interface following the first interface and forecasted by the mobile terminal, a second determination module, configured to determine whether a function supported by the second interface requires the camera assembly to be activated; and a controlling module, configured to control the camera assembly to move out of the terminal body in response to the function supported by the second interface requiring the camera assembly to be activated.

According to a third aspect of the present disclosure, a mobile terminal is provided and includes a terminal body and a camera assembly. The terminal body includes a non-transitory memory and a processor, the camera assembly and the non-transitory memory are coupled to the processor, the non-transitory memory is configured to store an instruction, and the instruction is executed by the processor to perform operations of: displaying, by the mobile terminal, a first interface, acquiring interface information of the first interface; determining a second interface based on the interface information of the first interface, wherein the second interface is a next interface following the first interface and forecasted by the mobile terminal; determining whether a function supported by the second interface requires the camera assembly to be activated; and controlling the camera assembly to move out of the terminal body in response to the function supported by the second interface requiring the camera assembly to be activated.

BRIEF DESCRIPTION OF DRAWINGS

In order to illustrate technical solutions of embodiments of the present disclosure clearly, accompanying drawings for describing the embodiments will be introduced in brief. Obviously, the drawings in the following description are only some embodiments of the present application. For those skilled in the art, other drawings can be acquired based on the provided drawings without any creative work.

DETAILED DESCRIPTION

Figure 1:
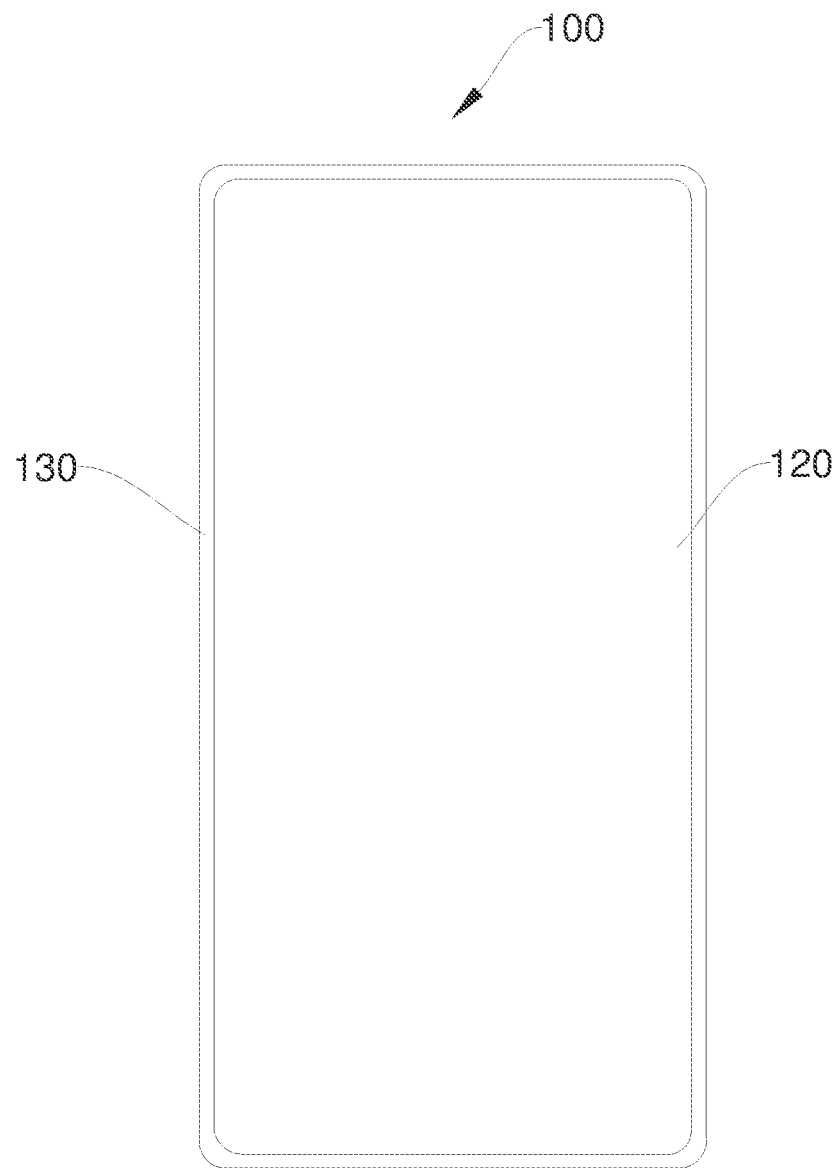
FIG. 1 is a structural schematic view of a first mobile terminal according to an embodiment of the present disclosure.

In order to enable ordinary skilled person in the art to understand technical solutions of the present disclosure better, the technical solutions of the embodiments of the present disclosure will be clearly and comprehensively described by referring to the accompanying drawings.

A display screen configured in a mobile terminal, such as a mobile phone, a tablet computer, a wearable mobile terminal, and so on, may generally display texts, images, icons, videos, and so on. As users have increasingly higher requirements for the resolution and fineness of displayed content, an increasing number of mobile terminals are configured with a large-sized touch screen to achieve a full-screen display effect. However, while configuring the large-sized touch screen, a front camera, a proximity sensor, a projection component, an earpiece and other functional devices disposed on a front of the mobile terminal may affect an area that the display screen may be expanded to reach.

Typically, the mobile terminal may include a front panel, a rear cover, and a side frame. The front panel may include an upper region, a middle screen region, and a lower keypad region. Generally, an earpiece sound hole may be defined in the upper region, and the front camera and other functional components may be disposed in the upper region. The touch screen may be disposed in the middle screen region. One to three physical buttons may be disposed in the lower keypad region. As the technology develops, the lower keypad region may be cancelled, and the physical buttons, which are originally disposed in the lower keypad region, may be removed, and virtual buttons may be displayed in the touch screen instead.

The earpiece sound hole and front camera disposed in the upper region may be significant for the mobile terminal to achieve functions, and may not be removed easily. Therefore, it may be significantly difficult to expand a display area of the touch screen to cover the upper region. After a series of studies, the applicant discovers that the functional components, such as projection assemblies, receivers, cameras, structural optical assemblies, and so on, may be disposed inside a terminal body or a back of the terminal body of the mobile terminal and may not be observed from an outside of the mobile terminal. Further, a sliding assembly or a rotation assembly may be configured to enable the functional components to be exposed from a top of the terminal body. In this way, the display region of the touch screen may be expanded to cover the original upper region to increase an area of the display region, achieving the full-screen display effect.

According to a first aspect of the present disclosure, a control method is provided and applied in a mobile terminal. The mobile terminal includes a terminal body and a camera assembly, the camera assembly is disposed inside the terminal body and is movable relative to the terminal body to move out of the terminal body. The method includes: displaying, by the mobile terminal, a first interface, and acquiring interface information of the first interface; determining a second interface based on the interface information of the first interface, wherein the second interface is a next interface following the first interface and forecasted by the mobile terminal; determining whether a function supported by the second interface requires the camera assembly to be activated; and controlling the camera assembly to move out of the terminal body in response to the function supported by the second interface requiring the camera assembly to be activated.

In some embodiments, after the determining a second interface based on the interface information of the first interface, the method further includes: determining a third interface based on interface information of the second interface, wherein the third interface is a next interface following the second interface and forecasted by the mobile terminal; determining whether a function supported by the third interface requires the camera assembly to be activated; and controlling the camera assembly to move out of the terminal body in response to the function supported by the third interface requiring the camera assembly to be activated.

In some embodiments, the camera assembly includes a front camera and a rear camera, and the method includes: determining which of the front camera and the rear camera corresponds to the function supported by the second interface based on the function supported by the second interface, in response to the function supported by the second interface requiring the camera assembly to be activated; activating the front camera or the rear camera correspondingly based on the camera determined as corresponding to the function supported by the second interface.

In some embodiments, the determining a second interface based on the interface information of the first interface, includes: acquiring historical data of at least one next interface switched from the first interface; obtaining a next interface having a highest switching frequency from the at least one next interface based on the historical data; and determining the next interface having the highest switching frequency as the second interface. The switching frequency is a frequency of the next interface being switched from the first interface.

In some embodiments, after the acquiring historical data of the mobile terminal switching from the first interface into at least one next interface, the method further includes: obtaining a next interface having a highest number of times of being switched from the at least one next interface based on the historical data; and determining the next interface having the highest number of times as the second interface. The number of times of being switched is the number of times of the next interface being switched from the first interface.

In some embodiments, the acquiring historical data of at least one next interface switched from the first interface, includes: acquiring an account currently logged on the mobile terminal; and acquiring the historical data of the at least one next interface switched from the first interface based on a record of the account.

In some embodiments, the determining whether a function supported by the second interface requires the camera assembly to be activated, includes: determining whether a target functional element is comprised in the interface information of the first interface, wherein the camera assembly is required to be activated in response to the target functional element being triggered. Controlling the camera assembly to move out of the terminal body in response to the function supported by the second interface requiring the camera assembly to be activated, includes: determining that the function supported by the second interface requires the camera assembly to be activated in response to the target functional element being comprised in the interface information of the first interface; and controlling the camera assembly to move out of the terminal body.

In some embodiments, after the controlling the camera assembly to move out of the terminal body, the method further includes: detecting a touch operation performed on the first interface; activating the camera assembly and displaying a preview image collected by the camera assembly on the second interface, in response to the touch operation performed on the target functional element being detected.

In some embodiments, the method further includes: retracting the camera assembly in the terminal body, in response to the touch operation detected as being performed on a region out of the target functional element of the first interface.

In some embodiments, the method further includes: retracting the camera assembly in the terminal body, in response to the touch operation performed on the target functional element being not detected within a predefined time period.

In some embodiments, the target functional element includes at least one of a widget and a link.

In some embodiments, the determining whether a function supported by the second interface requires the camera assembly to be activated, includes: reading a mapping relation table locally from the mobile terminal, wherein the mapping relation table comprises a mapping relation between the camera assembly and various functions; and determining whether the function supported by the second interface requires the camera assembly to be activated based on the mapping relation table.

In some embodiments, the controlling the camera assembly to move out of the terminal body in response to the function supported by the second interface requiring the camera assembly to be activated, includes: controlling the camera assembly to move out of the terminal body and activating the camera assembly, in response to the function supported by the second interface requiring the camera assembly to be activated; and displaying the first interface and hiding a preview image collected by the camera assembly.

In some embodiments, after the displaying the first interface and hiding the preview image collected by the camera assembly, the method further includes: displaying the preview image collected by the camera assembly in response to switching from the first interface into the second interface.

In some embodiments, the controlling the camera assembly to move out of the terminal body in response to the function supported by the second interface requiring the camera assembly to be activated, includes: controlling the camera assembly to move out of the terminal body in response to the function supported by the second interface comprising a scanning function and/or a photographing function.

In some embodiments, the interface information includes at least one of text information, image information, a widget, and a link.

According to a second aspect of the present disclosure, a control apparatus applied in a mobile terminal. The mobile terminal includes a terminal body and a camera assembly, the camera assembly is disposed inside the terminal body and is movable relative to the terminal body to be exposed out of the terminal body. The apparatus includes: an acquisition module, configured for the mobile terminal to display a first interface, and acquire interface information of the first interface; a first determination module, configured to determine a second interface based on the interface information of the first interface, wherein the second interface is a next interface following the first interface and forecasted by the mobile terminal, a second determination module, configured to determine whether a function supported by the second interface requires the camera assembly to be activated; and a controlling module, configured to control the camera assembly to move out of the terminal body in response to the function supported by the second interface requiring the camera assembly to be activated.

In some embodiments, the camera assembly includes a front camera and a rear camera, and controlling module includes: a camera determination module, configured to determine which of the front camera and the rear camera corresponds to the function supported by the second interface based on the function supported by the second interface in response to the function supported by the second interface requiring the camera assembly to be activated; and a camera activation module, configured to activate the front camera or the rear camera correspondingly based on the camera.

In some embodiments, the determination module includes: a historical data acquisition sub-module, configured to acquire historical data of each of at least one next interface switched from the first interface; a switching frequency acquisition sub-module, configured to select a next interface having a highest switching frequency from the at least one next interface based on the historical data, wherein the highest switching frequency is a highest frequency of the next interface being switched from the first interface; and a second interface determination module, configured to determine the next interface having the highest switching frequency to be the second interface.

According to a third aspect of the present disclosure, a mobile terminal is provided and includes a terminal body and a camera assembly. The terminal body includes a non-transitory memory and a processor, the camera assembly and the non-transitory memory are coupled to the processor, the non-transitory memory is configured to store an instruction, and the instruction is executed by the processor to perform operations of: displaying, by the mobile terminal, a first interface, acquiring interface information of the first interface; determining a second interface based on the interface information of the first interface, wherein the second interface is a next interface following the first interface and forecasted by the mobile terminal; determining whether a function supported by the second interface requires the camera assembly to be activated; and controlling the camera assembly to move out of the terminal body in response to the function supported by the second interface requiring the camera assembly to be activated.

Figure 2:
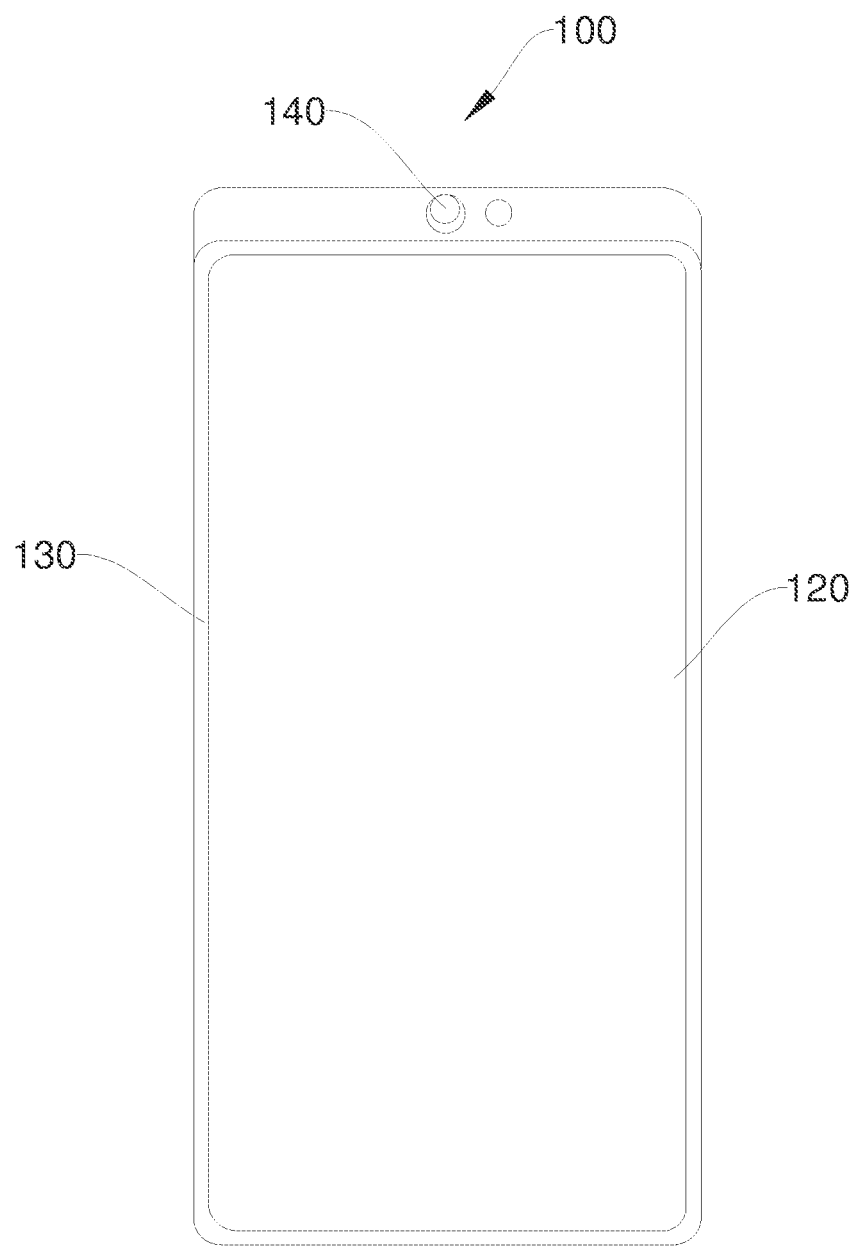
FIG. 2 is another structural schematic view of the first mobile terminal according to an embodiment of the present disclosure.

In an embodiment, as shown in FIG. 1 and FIG. 2, FIG. 1 shows a schematic structural view of a camera assembly of a mobile terminal 100 in an initial position; and FIG. 2 shows a schematic structural view of the camera assembly of a mobile terminal 100 in a lifted position, wherein the mobile terminal 100 may perform a method for controlling a terminal according to an embodiment of the present application. The mobile terminal 100 may include a terminal body 130 and a camera assembly 140. The camera assembly may include at least a base board, a receiver, and a camera. The camera assembly 140 may further include a structural optical assembly, a supplemental lighting element, and other functional elements, which will not be listed herein.

In a first implementation, as shown in FIG. 1 and FIG. 2, a back of the terminal body 130 may define a slide groove. The camera assembly 140 may be received in the slide groove and may slide to be exposed from a top of the terminal body 130. In details, a size and a shape of the camera assembly 140 may be adapted to a size and a shape of the slide groove. When the camera assembly 140 is in the initial position, the camera assembly 140 may be received in the slide groove, unable to be observed from the outside of the mobile terminal, and the camera assembly 140 and the terminal body may form an overall and integral structure. In this circumstance, the front camera, the receiver, and other functional components may be received in the slide groove, unable to be observed from the outside of the mobile terminal, and disposed at a side of the base board. When the camera assembly 140 slides along the slide groove towards the top of the terminal body 130, the receiver, the front camera, and other functional components may be exposed from the top of the terminal body 130. A rear camera, a flash, and other functional components may be disposed at a side of the base board away from the front camera. Alternatively, the rear camera, the flash, and other functional components may be disposed on the rear cover. Positions at which the rear camera, the flash, and other functional components may be disposed will not be limited by the present disclosure.

Figure 3:
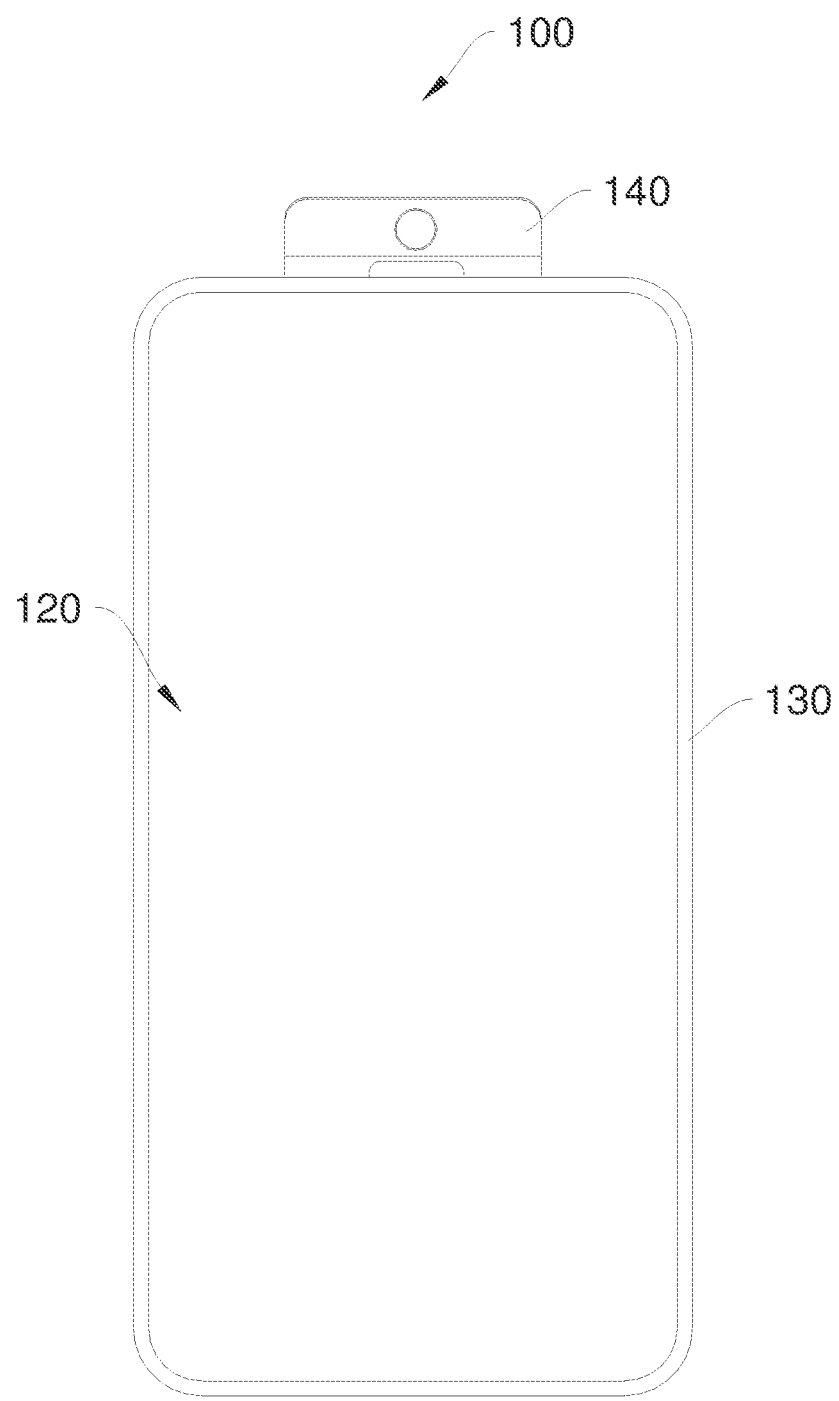
FIG. 3 is a structural schematic view of a second mobile terminal according to an embodiment of the present disclosure.

Further, in a second implementation, besides configuration of the camera assembly 140 shown in FIG. 1 and FIG. 2, the camera assembly 140 may further be configured as shown in FIG. 3. It may be understood that a width of the camera assembly 140 may be equal to or less than a width of the terminal body 130. When the width of the camera assembly 140 is less than the width of the terminal body 130, the camera assembly 140 may be disposed at a middle of the top of the terminal body 130 or disposed close to an edge of the top of the terminal body 130. A specific position at which the camera assembly 140 may be disposed will not be limited by the present disclosure.

Figure 4:
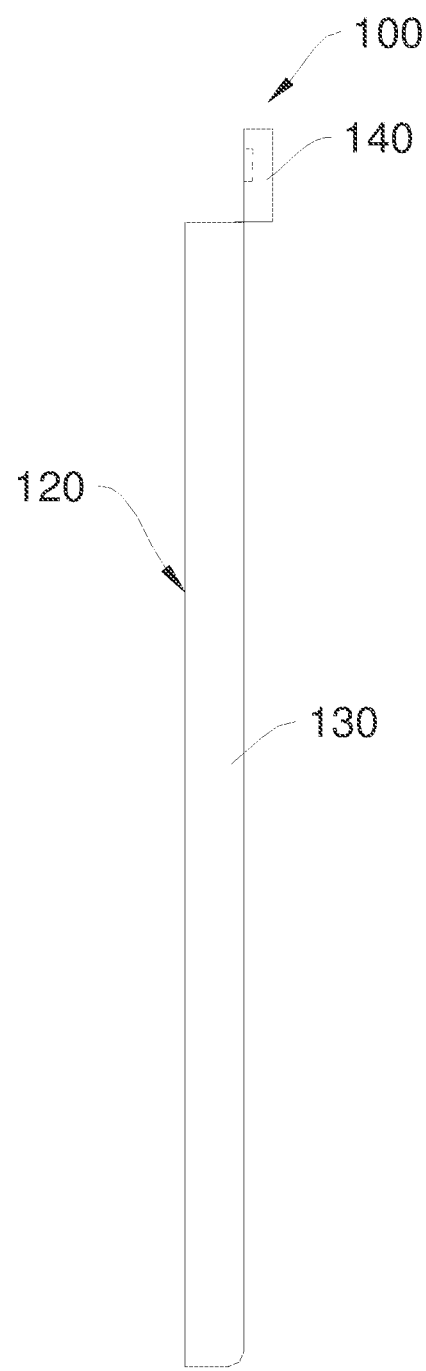
FIG. 4 is a structural schematic view of a third mobile terminal according to an embodiment of the present disclosure.

In a third implementation, as shown in FIG. 4, a structure of the mobile terminal shown in FIG. 4 may be different from the structures of the mobile terminals shown in FIG. 1 and FIG. 2. The camera assembly 140 shown in FIG. 4 may be slidably connected to the back of the terminal body 130 and may protrude from the back of the terminal body 130.

Figure 5:
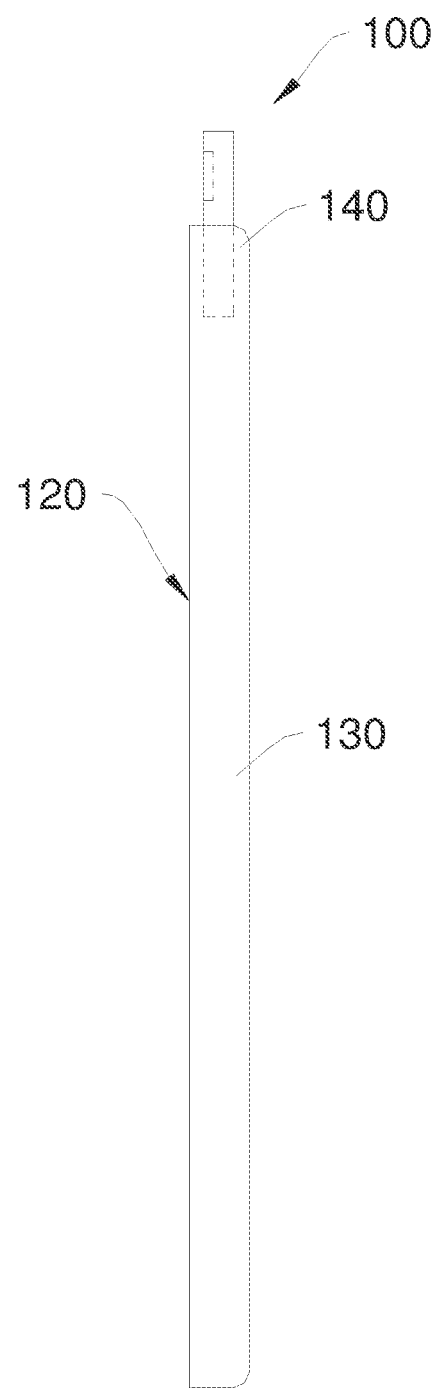
FIG. 5 is a structural schematic view of a fourth mobile terminal according to an embodiment of the present disclosure.

In a fourth implementation, as shown in FIG. 5, a structure of the mobile terminal shown in FIG. 5 may be different from the structures of the mobile terminals shown in FIG. 1 and FIG. 2. As shown in FIG. 5, the top of the terminal body 130 may define the slide groove, and the camera assembly 140 may be slidably connected to the slide groove at the top of the terminal body 130. It may be understood that the size and the shape of the camera assembly 140 may be adapted to the size and the shape of the slide groove. When the camera assembly 140 is at the initial position, the camera assembly 140 may be hidden from the outside and received in the slide groove, and the camera assembly 140 and the terminal body 130 may form an overall and integral structure. In this circumstance, the front camera, the receiver, and other functional components may be hidden from the outside, received in the slide groove, and disposed at a side of the base board. The rear camera and other functional components may be hidden from the outside, received in the slide groove, and disposed at the side of the base board away from the front camera. When the camera assembly 140 slides along the slide groove towards the top of the terminal body 130, the front camera, the receiver, the rear camera, and other functional components may be exposed from the top of the terminal body 130.

Figure 6:
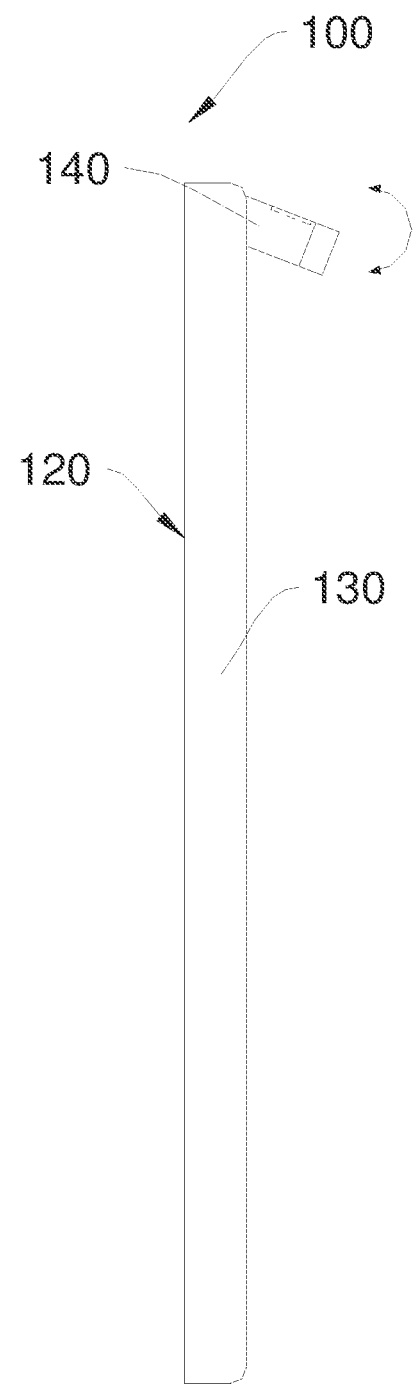
FIG. 6 is a structural schematic view of a fifth mobile terminal according to an embodiment of the present disclosure.

In a fifth implementation, as shown in FIG. 6, a structure of the mobile terminal shown in FIG. 6 may be different from the structures of the mobile terminals shown in FIG. 1 and FIG. 2. As shown in FIG. 6, the camera assembly 140 may rotate relative to the terminal body 130, and the camera assembly 140, which is hidden from the outside and disposed at the back of the terminal body, may be exposed from the top of the terminal body 130 by rotating.

Therefore, when activating the camera of the mobile terminal in the art, it takes time to activate the camera, the user may wait for a relatively long time period, reducing user experience. Through long-term research, the applicant discovers and provides a method for controlling the terminal, an apparatus for controlling the terminal, a mobile terminal, and a non-transitory storage medium according to the embodiments of the present disclosure. A next interface may be acquired based on a first interface. In response to a function supported by the next interface requiring to activate the camera assembly, the camera assembly may be controlled to rise in advance to reduce the time period for waiting the camera to rise, and the operation may be performed rapidly and easily. The method for controlling the terminal will be described in more details in the following embodiments.

Figure 7:
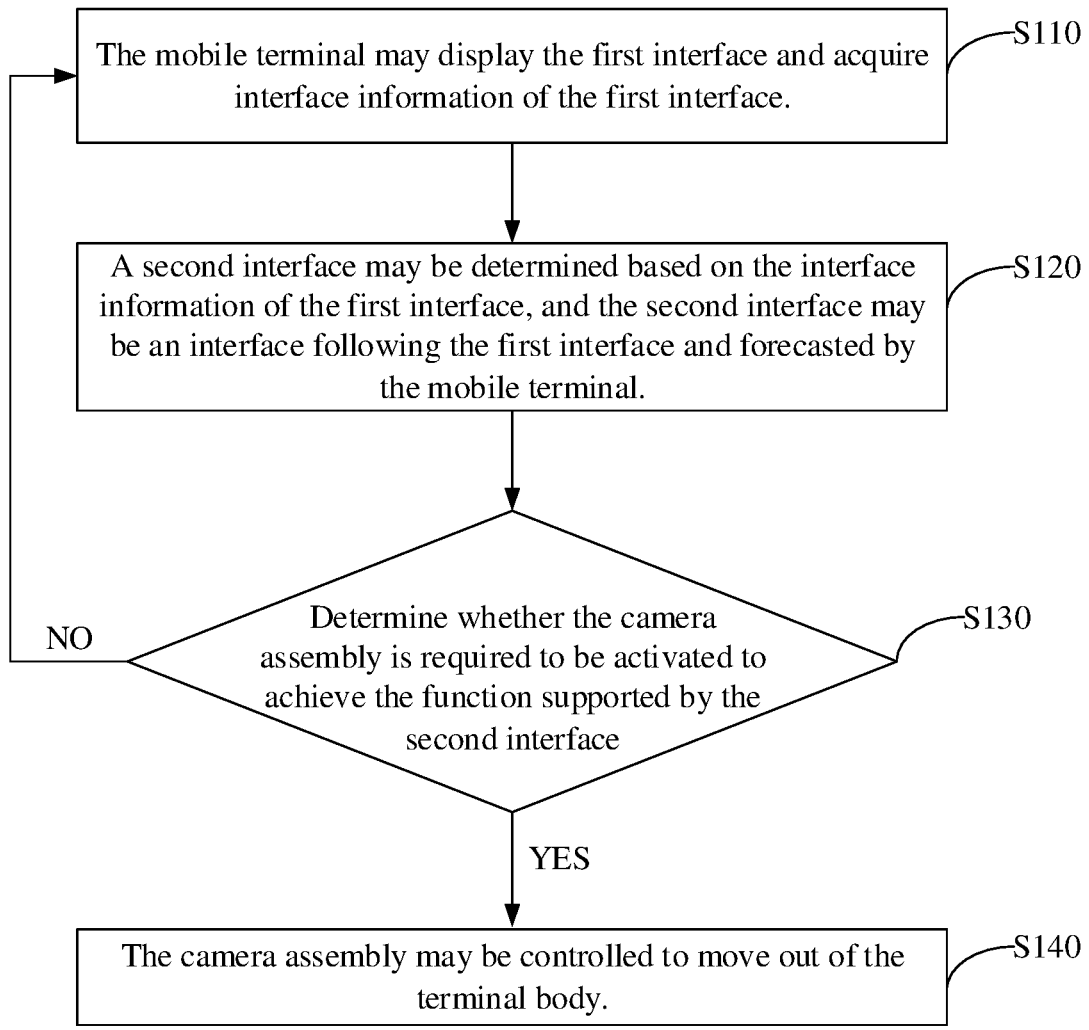
FIG. 7 is a flow chart of a method for controlling a terminal according to an embodiment of the present disclosure.
Figure 15:
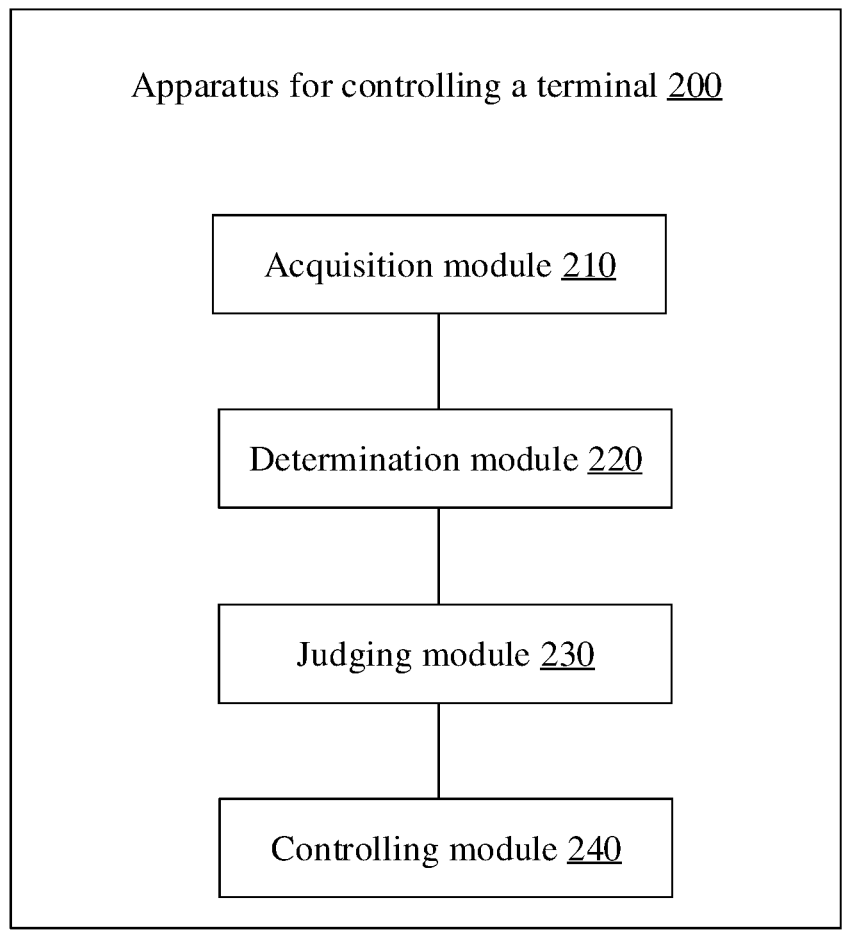
FIG. 15 is a diagram of an apparatus for controlling a terminal according to an embodiment of the present disclosure.
Figure 16:
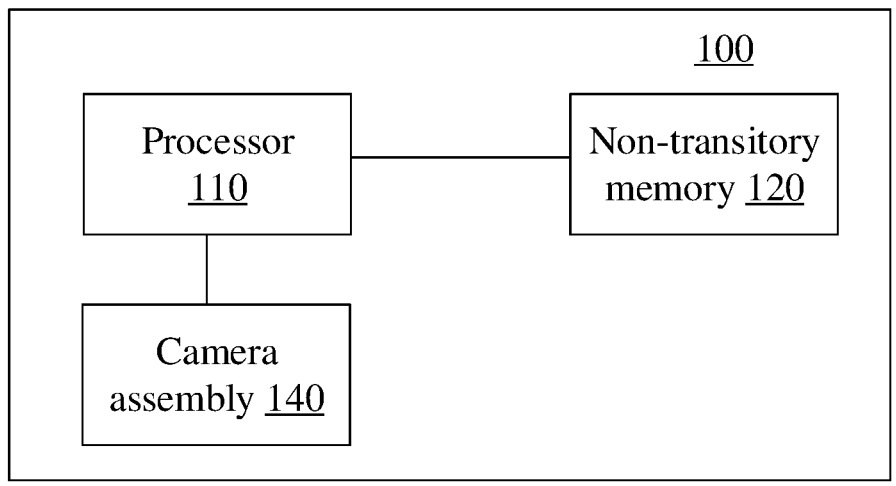
FIG. 16 is a diagram of a mobile terminal configured to perform a method for controlling the terminal according to an embodiment of the present disclosure.

As shown in FIG. 7, FIG. 7 is a flow chart of the method for controlling the terminal according to an embodiment of the present disclosure. The method includes acquiring a next interface based on a first interface. In response to a function supported by the next interface requiring to activate the camera assembly, the camera assembly may be controlled to rise in advance to reduce the time spent on waiting the camera to rise, and the operation may be performed rapidly and easily. In detailed embodiments, the method for controlling the terminal may be applied to the apparatus for controlling the terminal 200 as shown in FIG. 15 and the mobile terminal 100 (as shown in FIG. 16) configured with the apparatus 200 for controlling the terminal. In the following, a mobile terminal may be taken as an example to illustrate detailed processes of the present embodiment. It should be understood that the mobile terminal in the present embodiment may be a smart phone, a tablet computer, a wearable electronic device, and so on, which will not be limited by the present embodiment. The processes shown in FIG. 7 will be described in more details hereinafter, and method for controlling the terminal may include following operations.

In an operation S110, the mobile terminal may display the first interface and acquire interface information of the first interface.

In the present embodiment, the mobile terminal may display the first interface. The first interface may be a desktop of the mobile terminal or a page of an application. When the first interface is the page of the application, the application may be a systemic application of the mobile terminal or an application of a third party, which will not be limited by the present disclosure.

In an implementation, in response to the first interface being the desktop of the mobile terminal, the first interface may be generated while the mobile terminal is entering the desktop after being unlocked from a locking state. Alternatively, the first interface may be generated while the mobile is entering the desktop after being lit from a screen-off state.

The user may unlock the mobile terminal through fingerprint identification, digital password verification, voiceprint identification, iris identification, face identification, and so on. Further, the user may light the screen by clicking the screen of the mobile terminal, pressing a physical button and/or a virtual button of the mobile terminal, shaking the mobile terminal, and so on. Means of unlocking the mobile terminal and lighting the mobile terminal will not be limited by the present disclosure.

Further, the first interface may be generated while the mobile terminal is entering the desktop by enabling a foreground application to run at a background or by shutting down the application. A running state of the application may be monitored. For example, the application may be monitored to determine whether the application is running at the foreground, whether the application is switching from the foreground into the background, whether the application is shut down while running at the foreground. It should be understood that switching the application from the foreground to the background may indicate that the mobile terminal is displaying the first interface.

In another implementation, in response to the first interface being the page of the application of the mobile terminal, the first interface may be generated while the mobile terminal is running the application at the foreground. In the present embodiment, in response to a touch operation applied to an icon of the application being detected, in response to voice information instructing to activate the application being detected, or a touch operation applied to a link corresponding to the application being detected, the mobile terminal may respond to the above-mentioned touch operations and the voice information to run the application at the foreground and display the first interface corresponding to the application.

In addition, in response to the mobile terminal displaying the first interface, the interface information of the first interface may be acquired. It should be understood that the first interface may be changed over time. In other words, the interface information of the first interface may be changed over time. Therefore, in the present embodiment, the interface information of the first interface may be acquired in real time to improve veracity of the interface information of the first interface. The interface information of the first interface may include texts, images, widgets, links, and so on. In an implementation, recognition may be performed on the first interface to acquire at least one piece of interface information of the first interface.

In an operation S120, a second interface may be determined based on the interface information of the first interface, and the second interface may be an interface following the first interface and forecasted by the mobile terminal.

In the present embodiment, after the interface information of the first interface is determined, the interface information may be analyzed. For example, the texts of the interface information may be analyzed to acquire a meaning or an instruction indicated by the texts. Alternatively, the texts may be divided by words to acquire a plurality of words, a plurality of characters, a plurality of phrases, a plurality of terminologies, and so on. It should be noted that, a natural language algorithm may be applied to divide the texts by words based on semantics of the texts. Detailed processes of dividing the texts by words will not be described hereinafter.

In another example, the images of the interface information may be analyzed. An optical character recognition (OCR) operation may be performed to process an image displayed on the first interface to identify image information contained in the image. In details, an image-text conversion and identification operation may be applied to identify the image and convert the image into texts, and may be performed off-line. That is, an image-text conversion and identification library may be transplanted into the mobile terminal. In details, an image-text conversion and identification operation may be performed to the image information based on the image-text conversion and identification library stored in the mobile terminal. Alternatively, the above operation may be performed on-line, and that is, the image may be transmitted to remote to be identified by an image-text conversion server. The image information may be uploaded to the image-text conversion server. The image-text conversion server may perform the image-text conversion operation based on the image-text conversion and identification library stored in the server, and may transmit an identification result to the mobile terminal. Further, in addition to identifying and transmitting the texts in the image, the image-text conversion operation may also provide an x-coordinate, a y-coordinate, a width, and height of each character. More detailed image-text conversion operation will not be described in the present disclosure.

After the interface information is analyzed, the next interface following the first interface may be forecasted based on an analysis result, and the forecasted next interface may be determined to be the second interface. It should be understood that, a basis of forecasting may include the texts, the images, the widgets, and the links contained in the interface information of the first interface. The basis of forecasting may further include historical data of at least one next interface switched from the first interface. The present disclosure does not limit the basis of forecasting.

In an operation S130, it may be determined whether the camera assembly is required to be activated to achieve the function supported by the second interface.

In an implementation, the mobile terminal may preset whether a function requires the camera assembly to be activated. For example, a photographing function may be preset as requiring the camera assembly to be activated, a scanning function may be preset as requiring the camera assembly to be activated, and a calculator function may be preset as not requiring the camera assembly to be activated. A mapping relation may be generated between the function and the camera assembly, and a mapping relation form may be generated and stored in the mobile terminal. As shown in Table 1, for example, a function A1 may require the camera assembly to be activated, and a function A2 may not require the camera assembly to be activated, and so on. A system of the mobile terminal may automatically determine whether a function requires the camera assembly to be activated. The present disclosure does not limit which function requires the camera assembly to be activated.

Further, the function supported by the second interface may be acquired. It should be understood that, the number of functions supported by the second interface may be one or more, which will not be limited by the present disclosure. When the number of functions supported by the second interface is one, the mobile terminal may determine whether the only one function requires the camera assembly to be activated. When the number of functions supported by the second interface is more than one, the mobile terminal may determine whether the more than one functions include a function requiring the camera assembly to be activated. It should be understood that, in response to the more than one functions including the function requiring the camera assembly to be activated, the more than one functions supported by the second interface may be determined as requiring the camera assembly to be activated. In details, after determining the function supported by the second interface, the function supported by the second interface may be compared to each of a plurality of functions pre-stored in the mapping relation table to acquire a function in the table matching the function supported by the second interface. Further, based on the mapping relation table, it may be determined the function requires or does not require the camera assembly to be activated. In this way, it may be determined whether the function supported by the second interface requires the camera assembly to be activated.

TABLE 1

| Function | Camera assembly |
|---|---|
| A1, A3 | To be activated |
| A2, A4 | Not to be activated |

In an operation S140, in response to the function supported by the second interface requiring the camera assembly to be activated, the camera assembly may be controlled to move out of the terminal body.

In the present embodiment, in response to the function supported by the second interface requiring the camera assembly to be activated, such as the scanning function, the photographing function, and so on, the camera assembly may be controlled correspondingly to move out of the terminal body, such that the camera assembly may rise in advance while the mobile terminal is displaying the first interface, time spent on controlling the camera to rise while the second interface is being displayed may be reduced, and time that the user spent on waiting the camera to rise may be reduced. A function supported by the first interface may not require the camera assembly to be activated. Alternatively, the function supported by the first interface may require the camera assembly to be activated, but the function may not be enabled.

According to the present disclosure, the method for controlling the terminal may be provided. The mobile terminal may display the first interface, acquire the interface information of the first interface, and determine the second interface based on the interface information of the first interface. The second interface may be the next interface following the first interface and forecasted by the mobile terminal. The mobile terminal may determine whether the function supported by the second interface requires the camera assembly to be activated. In response to the function supported by the second interface requiring the camera assembly to be activated, the camera assembly may be controlled to move out of the terminal body. In this way, the next interface may be acquired based on the first interface, and in response to the function supported by the next interface requiring the camera assembly to be activated, the camera assembly may rise in advance, reducing the time that the user spends on waiting the camera to rise. The activation of the camera assembly may be performed rapidly and easily.

Figure 8:
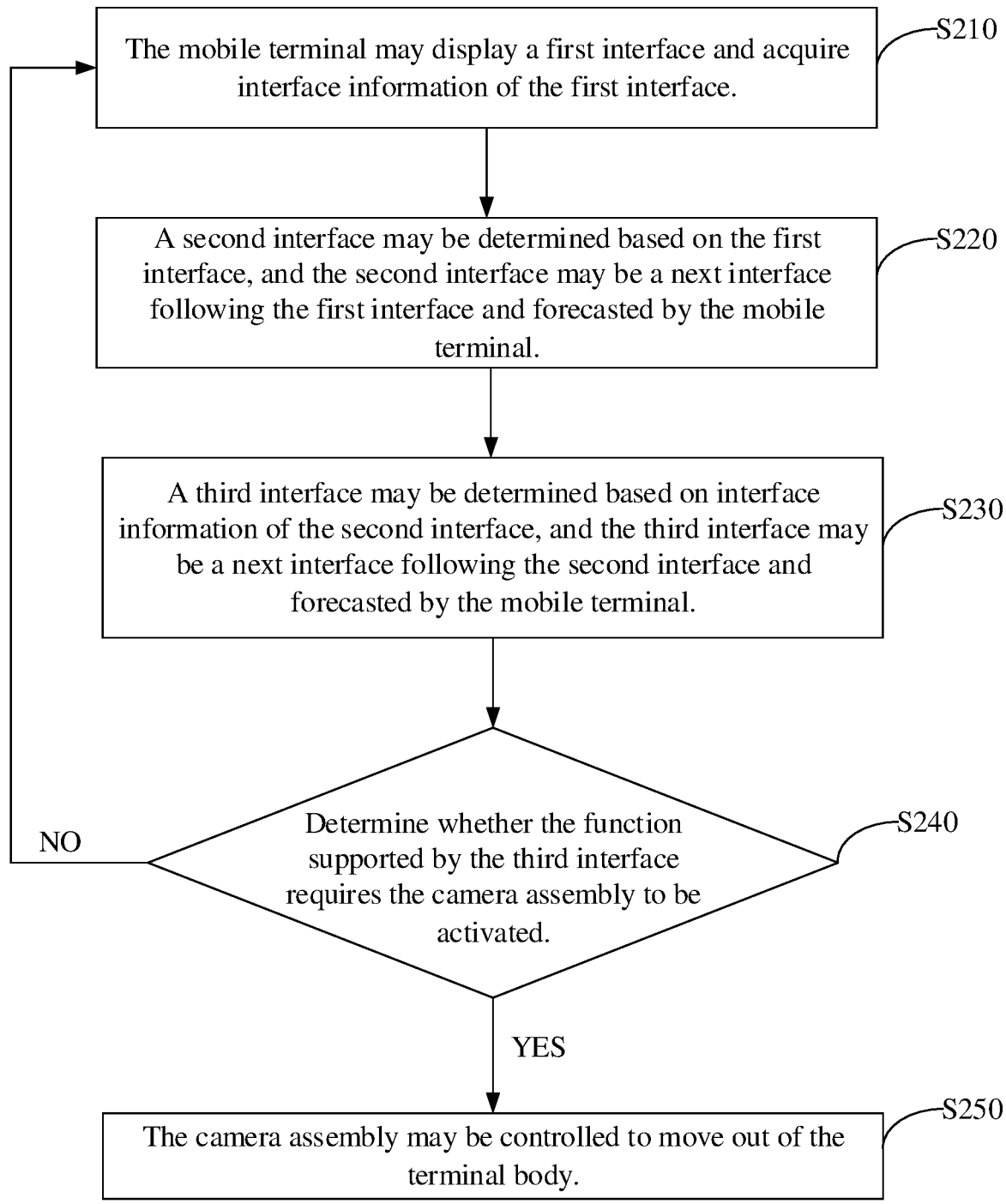
FIG. 8 is a flow chart of a method for controlling a terminal according to another embodiment of the present disclosure.

As shown in FIG. 8, FIG. 8 is a flow chart of a method for controlling a terminal according to another embodiment of the present disclosure. The method for controlling the terminal may be applied to the above-mentioned mobile terminal. Processes shown in FIG. 8 will be described in details, and the method may include following operations.

In an operation S210, the mobile terminal may display a first interface and acquire interface information of the first interface.

In an operation S220, a second interface may be determined based on the first interface, and the second interface may be a next interface following the first interface and forecasted by the mobile terminal.

Details of performing the operations S210 to S220 may refer to the description about the operations S110 to S120, which will not be repeatedly described hereinafter.

In an operation S230, a third interface may be determined based on interface information of the second interface, and the third interface may be a next interface following the second interface and forecasted by the mobile terminal.

In the present embodiment, after the second interface is determined, the interface information of the second interface may be acquired. Similarly, in order to improve veracity of the interface information of the second interface, the interface information of the second interface may be acquired in real time. The interface information of the second interface may include texts, images, widgets, links, and so on. In an implementation, the second interface may be identified to acquire at least one piece of interface information of the second interface.

Further, after the interface information of the second interface is determined, the next interface following the second interface may be forecasted based on the interface information of the second interface, and the next interface following the second interface may be taken as the third interface. A method of forecasting the third interface may be similar to the method of forecasting the second interface, and will not be repeatedly described hereinafter.

It should be noted that, the present embodiment will not be limited to forecasting whether a function supported by the third interface requires the camera assembly to be activated. In the present embodiment, the mobile terminal may also forecast whether a function supported by a fourth interface requires the camera assembly to be activated, and the fourth interface may be a next interface following the third interface and forecasted by the mobile terminal based on interface information of the third interface. Alternatively, the mobile terminal may also forecast whether a function supported by a fifth interface requires the camera assembly to be activated, and the fifth interface may be a next interface following the fourth interface and forecasted by the mobile terminal based on interface information of the fourth interface. It should be understood that, a plurality of interfaces following the first interface may be forecasted, and the camera assembly may be controlled to rise out of the terminal body a plurality of interfaces in advance, such that a situation of the user waiting the camera to rise caused by interfaces being switched rapidly but the camera rising slowly may be avoided. The number of interfaces that the camera is controlled to rise in advance may be set by the mobile terminal arbitrarily or set by the user manually, which will not be limited by the present disclosure.

In an operation S240, it may be determined whether the function supported by the third interface requires the camera assembly to be activated.

In an operation S250, in response to the function supported by the third interface requiring the camera assembly to be activated, the camera assembly may be controlled to rise out of the terminal body.

Details of performing the operations S240 to S250 may refer to the description of the operations S130 to S140, and will not be repeatedly described hereinafter.

According to the present disclosure, the method for controlling the terminal may be provided. The mobile terminal may display the first interface, acquire the interface information of the first interface, and determine the second interface based on the interface information of the first interface. The second interface may be the next interface following the first interface and forecasted by the mobile terminal. The mobile terminal may determine the third interface based on the interface information of the second interface, and the third interface may be the next interface following the second interface and forecasted by the mobile terminal. The mobile terminal may determine whether the function supported by the third interface requires the camera assembly to be activated. In response to the function supported by the third interface requiring the camera assembly to be activated, the camera assembly may be controlled to move out of the terminal body. Compared to the method shown in FIG. 7, a plurality of interfaces following the first interface may be acquired in the present embodiment. In response to the function supported by the plurality of interfaces following the first interface requiring the camera assembly to be activated, the camera assembly may be controlled to rise at a plurality of interfaces in advance, further reducing the time that the user spent on waiting the camera to rise, and the activation of camera assembly may be performed rapidly and easily.

Figure 9:
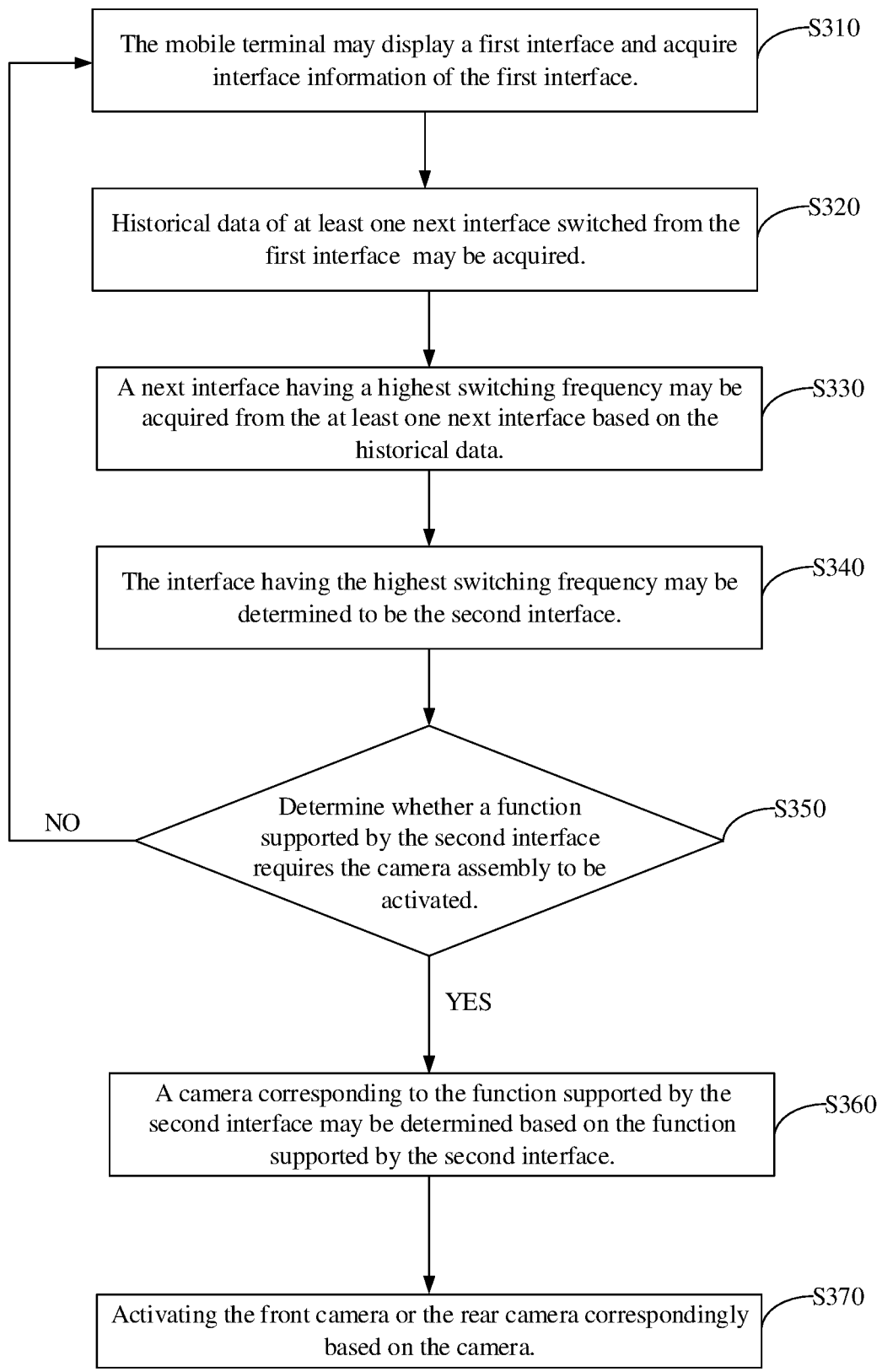
FIG. 9 is a flow chart of a method for controlling a terminal according to still another embodiment of the present disclosure.

As shown in FIG. 9, FIG. 9 is a flow chart of a method for controlling a terminal according to still another embodiment of the present disclosure. The method for controlling the terminal may be applied in the above-mentioned mobile terminal. Processes shown in FIG. 9 will be described in details, and the method may include following operations.

In an operation S310, the mobile terminal may display a first interface and acquire interface information of the first interface.

In an operation S320, historical data of at least one next interface switched from the first interface may be acquired.

In the present, the at least one next interface following the first interface may include one interface or a plurality of interfaces. It should be understood that, when the next interface following the first interface includes only one interface, switching from the first interface to the at least one next interface may refer to switching from the first interface to the only one interface following the first interface. When the next interface following the first interface includes more than one interfaces, switching from the first interface to the at least one next interface may refer to switching from the first interface to various interfaces following the first interface. Therefore, the number of next interfaces following the first interface may be acquired, and historical data of the next interfaces switched from the first interface may be acquired, such as the number of times of switching from the first interface to each of the at least one next interface, a frequency of switching from the first interface into each of the at least one next interface, and so on.

The historical data may be related to the mobile terminal or an account, which will not be limited by the present disclosure. For example, when the historical data is related to the mobile terminal, historical data of each of the at least one next interface switched from the first interface while the mobile terminal running an application corresponding to the first interface may be acquired. When the historical data is related to the account, historical data of each of the at least one next interface switched from the first interface while the account running the application corresponding to the first interface may be acquired. The account may be logged in and used on various mobile terminals.

In an operation S330, a next interface having a highest switching frequency may be acquired from the at least one next interface based on the historical data. The switching frequency may refer to a frequency of the next interface of being switched from the first interface.

In an implementation, a frequency of switching from the first interface into each of the at least one next interface (i.e. the switching frequency of each of the at least one next interface) may be acquired from the historical data. The frequency of switching from the first interface into each of the at least one next interface may be placed in order, so as to acquire the next interface having the highest frequency of being switched from the first interface. For example, when the at least one next interface following the first interface includes three interfaces, an interface B, an interface C, and an interface D. In other words, the mobile terminal may switch from the first interface to the interface B, the interface C, and the interface D directly. In the present embodiment, based on the historical data, a frequency of switching from the first interface to the interface B, a frequency of switching from the first interface to the interface C, and a frequency of switching from the first interface to the interface C may be acquired. Further, one of the interface B, the interface C, and the interface D having the highest switching frequency (i.e. the highest frequency of being switched from the first interface) may be acquired.

In an operation S340, the interface having the highest switching frequency may be determined to be the second interface.

The interface having the highest switching frequency (i.e. the highest frequency of being switched from the first interface) may be determined to be an interface used by the user most frequently. In other words, the interface having the highest possibility of being switched from the first interface may be the interface used by the user most frequently. For example, a switching frequency of the interface B may be 70%, a switching frequency of the interface C may be 20%, a switching frequency of the interface D may be 10%, and the interface B may be determined as the second interface. Alternatively, the switching frequency of the interface B may be 30%, the switching frequency of the interface C may be 60%, the switching frequency of the interface D may be 10%, and the interface C may be determined as the second interface.

In another implementation, the number of times of switching from the first interface to each of the at least one next interface may be acquired from the historical data. The number of times of switching from the first interface to each of the at least one next interface may be placed in order, so as to determine a next interface having a highest number of times of being switched from the first interface. The next interface having the highest number of times of being switched from the first interface may be determined as the interface being used by the user most frequently, and thus, may be determined as the second interface.

In an operation S350, it may be determined whether a function supported by the second interface requires the camera assembly to be activated.

Details of performing the operation S350 may refer to the description of the operation S130, and will not be repeatedly described hereinafter.

In an operation S360, in response to the function supported by the second interface requiring the camera assembly to be activated, a camera corresponding to the function supported by the second interface may be determined based on the function supported by the second interface.

In the present embodiment, the camera assembly may include the front camera and the rear camera. The function supported by the second interface may include self-photographing, photographing, scanning a bicycle, scanning for unlocking, scanning for payment, scanning for adding a friend, and so on. Therefore, in the present embodiment, the function supported by the second interface may be determined. For example, the function supported by the second interface may be determined as self-photographing, photographing, scanning the bicycle, scanning for unlocking, scanning for payment, or scanning for adding the friend. The camera corresponding to the function supported by the second interface may be determined based on the function. In details, in response to the function supported by the second interface being self-photographing, the front camera may be determined as the camera corresponding to the function supported by the second interface. In response to the function supported by the second interface being photographing, scanning the bicycle, scanning for unlocking, scanning for payment, or scanning for adding the friend, the rear camera may be determined as the camera corresponding to the function supported by the second interface. The second interface may support even more functions, which will not be listed herein completely.

In an operation S370, activating the front camera or the rear camera correspondingly based on the camera.

It should be understood that, in response to the camera corresponding to the function supported by the second interface being the front camera, the front camera may be activated correspondingly; and in response to the camera corresponding to the function supported by the second interface being the rear camera, the rear camera may be activated correspondingly. In this way, automatic activation of the front camera or the rear camera may be achieved.

According to the present disclosure, the method for controlling terminal may be provided. The mobile terminal may display the first interface, acquire the interface information of the first interface, acquire the historical data of the at least one next interface switched from the first interface into, acquire the interface having the highest frequency of being switched form the first interface from the at least one next interface based on the historical data, determine the interface having the highest frequency of being switched form the first interface as the second interface, and determine whether the function supported by the second interface requires the camera assembly to be activated. In response to the function supported by the second interface requiring the camera assembly to be activated, the mobile terminal may determine which of the front camera and the rear camera corresponds to the function supported by the second interface based on the function supported by the second interface, and activate the front camera or the rear camera correspondingly based on the camera. Compared to the method for controlling the terminal as shown in FIG. 7, the second interface may be determined based on the historical data of the at least one next interface switched from the first interface in the present embodiment, and the front camera or the rear camera may be activated correspondingly based on the function supported by the second interface in response to the function requiring the camera to be activated. In this way, accuracy of determining the second interface may be improved, and accuracy of activating the camera may be improved.

Figure 10:
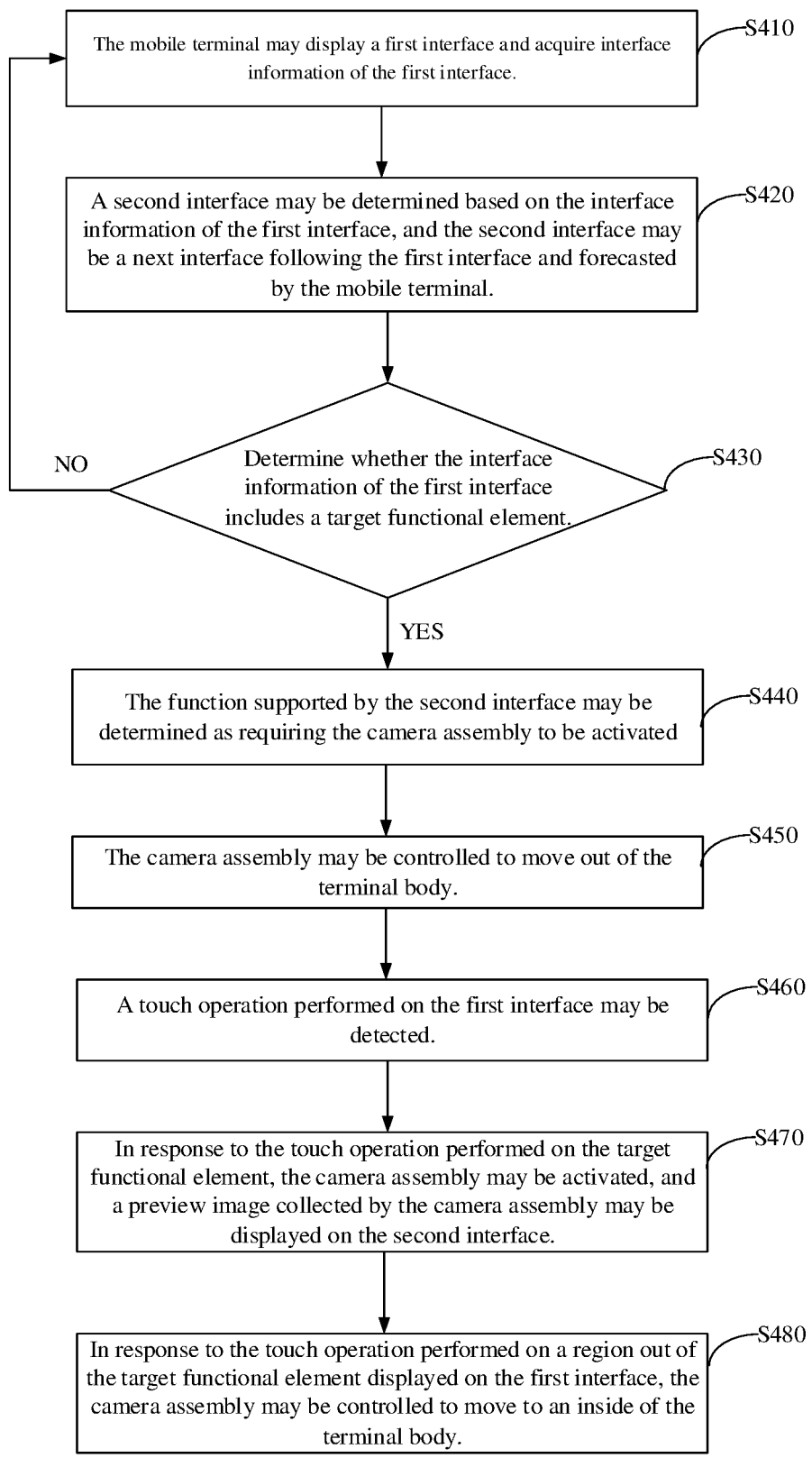
FIG. 10 is a flow chart of a method for controlling a terminal according to yet another embodiment of the present disclosure.

As shown in FIG. 10, FIG. 10 is a flow chart of a method for controlling a terminal according to yet another embodiment of the present disclosure. The method for controlling the terminal may be applied in the above-mentioned mobile terminal. Processes shown in FIG. 10 will be described in details, and the method may include following operations.

In an operation S410, the mobile terminal may display a first interface and acquire interface information of the first interface.

In an operation S420, a second interface may be determined based on the interface information of the first interface, and the second interface may be a next interface following the first interface and forecasted by the mobile terminal.

Details of performing the operations S410 to S420 may refer to description of the operations S110 to S120, and will not be repeatedly described hereinafter.

In an operation S430, it may be determined whether the interface information of the first interface includes a target functional element, and the camera assembly may be activated while the target functional element is being triggered.

In the present embodiment, the interface information of the first interface may be analyzed to determine whether the interface information of the first interface includes the target functional element, and the camera assembly may be activated in response to the target functional element being triggered. In other words, the target functional element may be taken as a switch of the camera assembly, and the camera assembly may be activated by perform touch operation on the target functional element.

Figure 11:
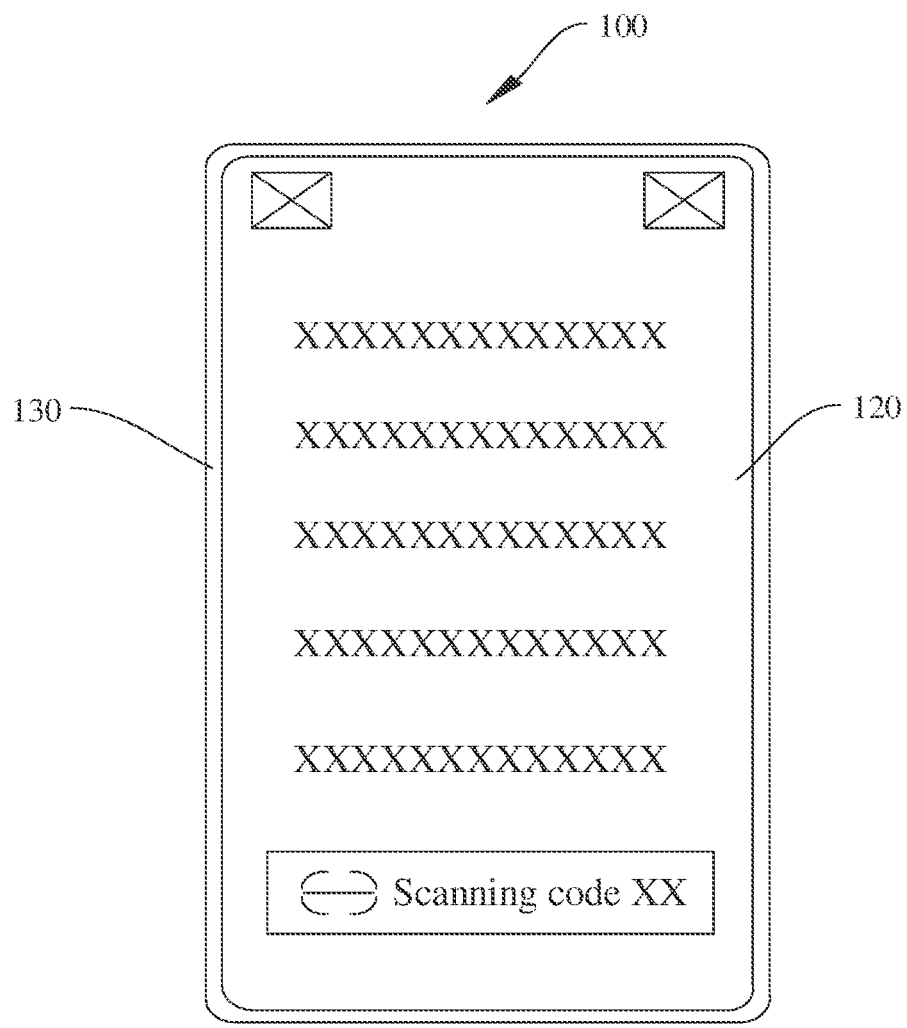
FIG. 11 is a view of an interface of a mobile terminal according to yet another embodiment of the present disclosure.
Figure 12:
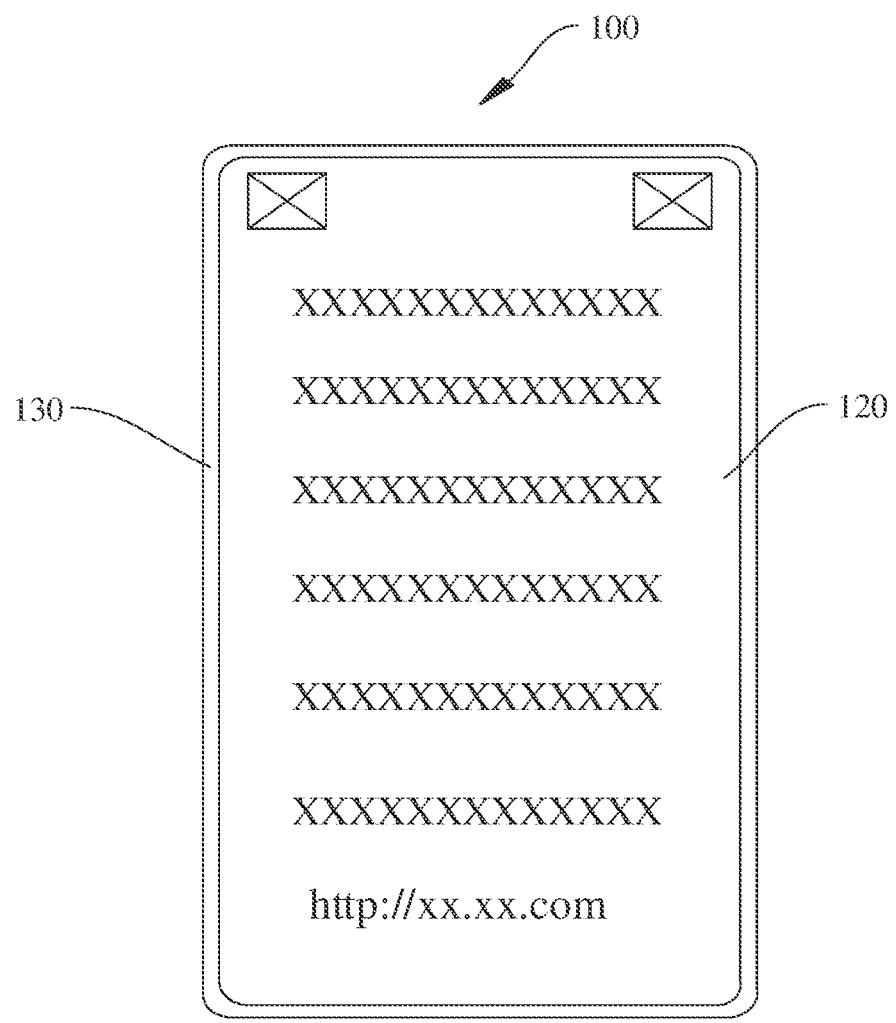
FIG. 12 is a view of another interface of a mobile terminal according to yet another embodiment of the present disclosure.
Figure 13:
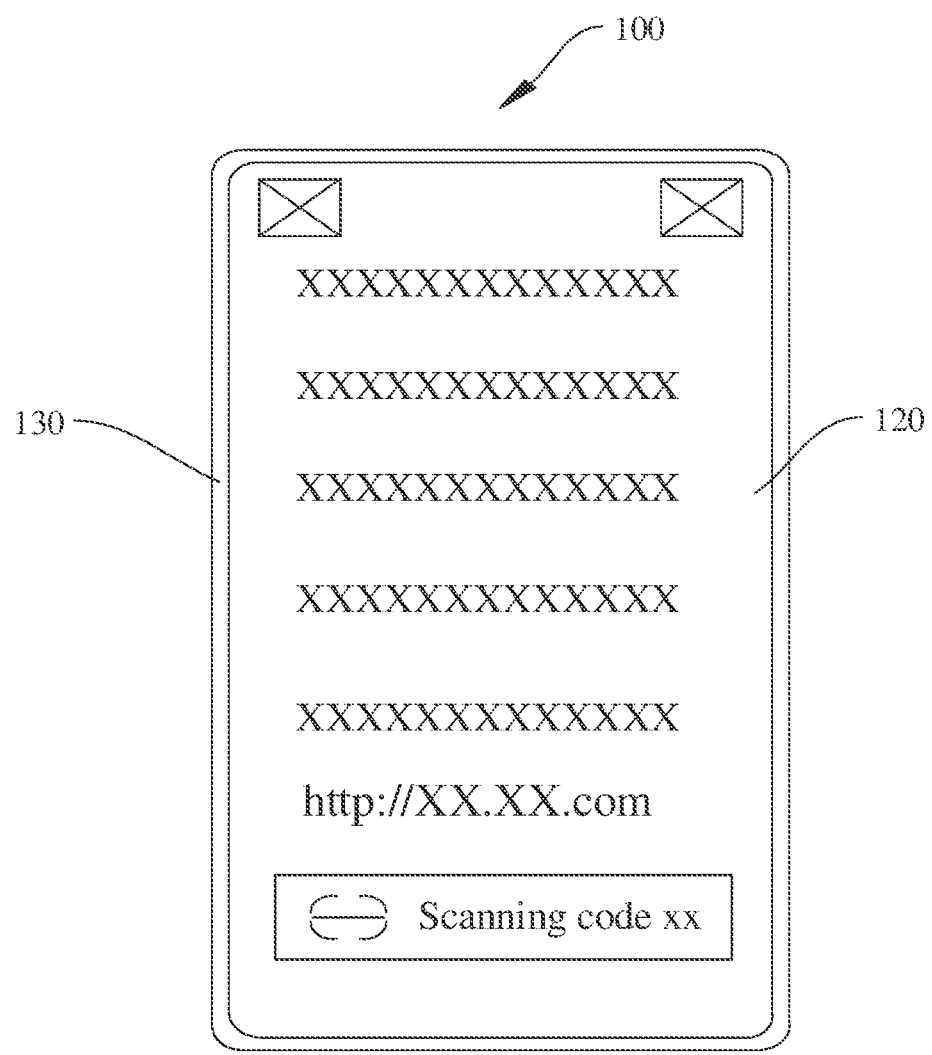
FIG. 13 is a view of still another interface of a mobile terminal according to yet another embodiment of the present disclosure.

The target functional element may be displayed in a part of a lower half region of the first interface, a part of an upper half region of the first interface, a part of a left half region of the first interface, a part of a right half region of the first interface. Further, the target functional element may be displayed by covering the first interface and on a level higher than the rest content displayed in the first interface, or may be displayed at a same level of the rest content displayed in the first interface. The present disclosure does not limit the location at which the target functional element is displayed. In an implementation, the target functional element may be a widget, as shown in FIG. 11. The target functional element may be a link as shown in FIG. 12. The target functional element may include both the widget and the link as shown in FIG. 13.

In an operation S440, in response to the interface information of the first interface including the target functional element, the function supported by the second interface may be determined as requiring the camera assembly to be activated.

The interface information of the first interface including the target functional element indicates that the mobile terminal may switch from the first interface to the next interface requiring to activate the camera assembly. That is, the function supported by the next interface following the first interface may require the camera assembly to be activated. Therefore, it may be determined that the function supported by the second interface may require the camera assembly to be activated.

In an operation S450, the camera assembly may be controlled to move out of the terminal body.

In an operation S460, a touch operation performed on the first interface may be detected.

Further, the touch operation performed on the first interface may be detected. The touch operation may include single-finger clicking, multi-finger clicking, single-finger touching and holding, multi-finger touching and holding, heavy pressing, multiple times of clicking, sliding, and so on. The single-finger clicking may refer to only one finger performing a clicking operation on the first interface. The multi-finger clicking may refer to more than one fingers performing clicking operations at the same time on the first interface. The single-finger touching and holding may refer to only one finger pressing the first interface for a time period longer than a predefined time period. The multi-finger touching and holding refer to more than one fingers pressing the first interface for a time period longer than a predefined time period. The heavy pressing may refer to a pressure applied to the first interface being greater than a predefined pressure. The multiple times of clicking may refer to the number of times of clicking within a predefined time period being greater than a predefined number of times. The sliding may refer to sliding on the first interface.

In an operation S470, in response to the touch operation performed on the target functional element, the camera assembly may be activated, and a preview image collected by the camera assembly may be displayed on the second interface.

It should be understood that, in response to the touch operation performed on the target functional element, for example, in response to the single-finger clicking performed on the widget of the first interface, or in response to the single-finger clicking performed on the link of the first interface, the mobile terminal may switch from the first interface to the second interface, and may activate the camera assembly to collect the preview image. The preview image collected by the camera assembly may be displayed on the second interface. In the present embodiment, in response to switching to the second interface, the preview image collected by the camera assembly may be displayed on the second interface in time, reducing the time spent on waiting the camera assembly to be activated after the second interface is displayed.

In an operation S480, in response to the touch operation performed on a region out of the target functional element displayed on the first interface, the camera assembly may be controlled to move to an inside of the terminal body.

In an implementation, in response to the touch operation performed on the region out of the target functional element displayed on the first interface, for example, in response to the touch operation performed on an element other than the target functional element, or in response to the touch operation performed on a blank region of the first interface, the mobile terminal may switch into a next interface not requiring the camera assembly to be activated. In this way, the camera assembly may be controlled to move to the inside of the terminal body. Alternatively, when the mobile terminal is displaying the first interface, the camera assembly is disposed inside the terminal body. In response to the touch operation performed on a region out of the target functional element displayed on the first interface, the camera assembly remains inside of the terminal body, i.e. the camera assembly remains unmoved.

In another implementation, in response to the touch operation not performed on the target functional element within a predefined time period, for example, in response to the touch operation not performed within 10 seconds or within 5 seconds, the user of the mobile terminal may desire to stay on the first interface. The function supported by the first interface may not require the camera assembly to be activated, or the function supported by the first interface requires the camera assembly to be activated, but the function may not be enabled. Therefore, the camera assembly may be controlled to move to the inside of the terminal body, or controlled to remain inside of the terminal body.

According to the present embodiment, the method for controlling the terminal may be provided. The mobile terminal may display the first interface, acquire the interface information of the first interface, determine the second interface based on the interface information of the first interface, and determine whether the target functional element is included in the interface information of the first interface. The camera assembly may be activated while the target functional element is being triggered. In response to the target functional element being included in the interface information of the first interface, the mobile terminal may determine that the function supported by the second interface may require the camera assembly to be activated, and may control the camera assembly to move out of the terminal body. The mobile terminal may detect the touch operation performed on the first interface. In response to the touch operation performed on the target functional element, the mobile terminal may activate the camera assembly and display the preview image collected by the camera assembly on the second interface. In response to the touch operation performed on the region out of the target functional element of the first interface, the mobile terminal may control the camera assembly to move to the inside of the terminal body. Compared to the method for controlling the terminal shown in FIG. 7, the mobile terminal may determine whether the function supported by the second interface may require the camera assembly to be activated based on the target functional element of the first interface in the present embodiment. In this way, accuracy of determination may be improved. Further, the camera assembly may be activated or deactivated by detecting the touch operation performed on the first interface, so as to improve an effect of using the camera assembly and achieve auto-control of the camera assembly.

Figure 14:
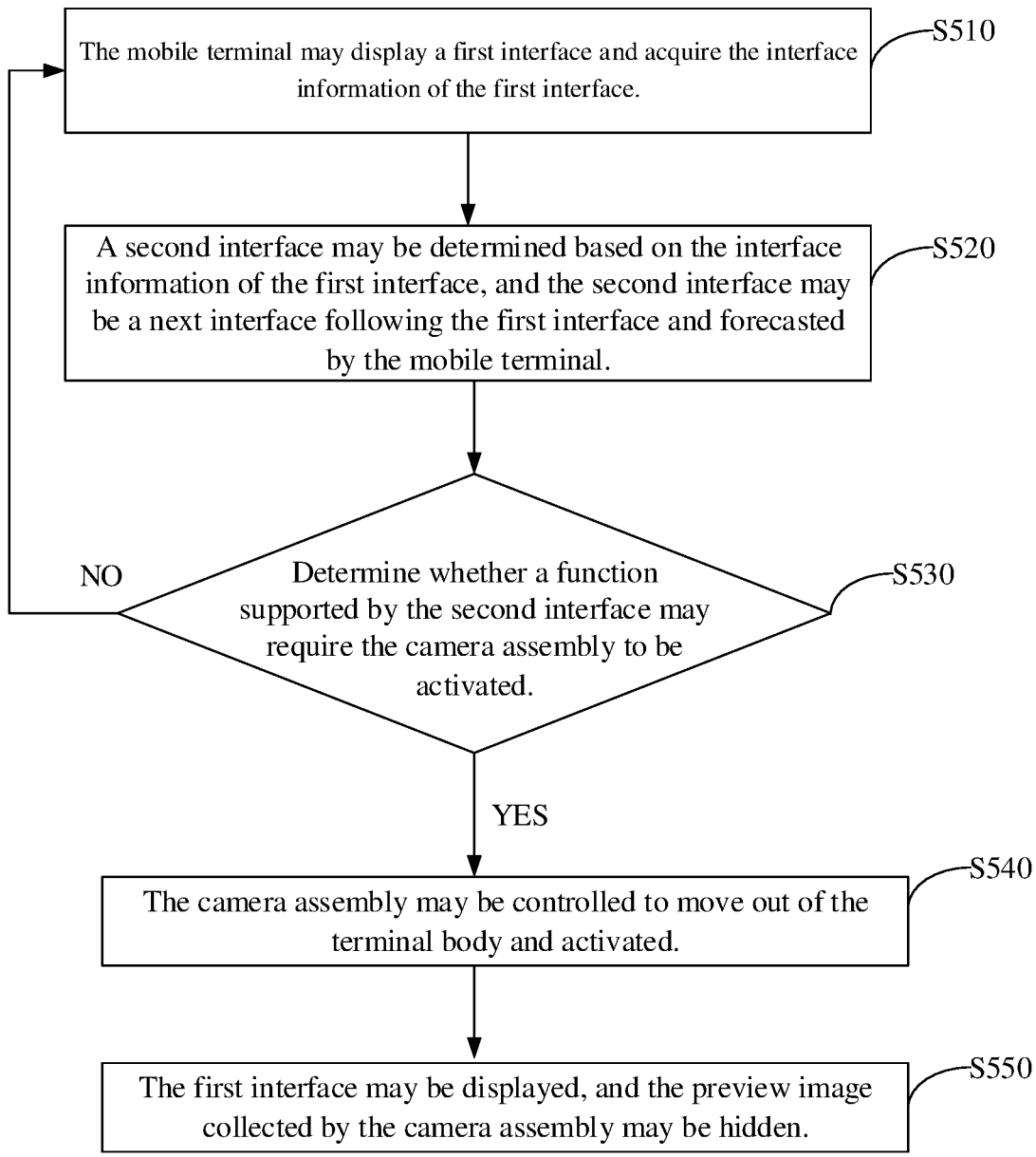
FIG. 14 is a flow chart of a method for controlling a terminal according to another embodiment of the present disclosure.

As shown in FIG. 14, FIG. 14 is a flow chart of a method for controlling a terminal according to another embodiment of the present disclosure. The method for controlling the terminal may be applied in the above-mentioned mobile terminal. Processes shown in FIG. 14 will be described in details, and the method may include following operations.

In an operation S510, the mobile terminal may display a first interface and acquire the interface information of the first interface.

In an operation S520, a second interface may be determined based on the interface information of the first interface, and the second interface may be a next interface following the first interface and forecasted by the mobile terminal.

In an operation S530, it may be determined whether a function supported by the second interface may require the camera assembly to be activated.

Details of performing the operations S510 to S530 may refer to the description of the operations S110 to S130, and will not be repeatedly described hereinafter.

In an operation S540, in response to the function supported by the second interface requiring the camera assembly to be activated, the camera assembly may be controlled to move out of the terminal body and activated.

In the present embodiment, in response to determining the function supported by the second interface requiring the camera assembly to be activated, the mobile terminal may control the camera assembly to move out of the terminal body and activate the camera assembly at the same time. The camera assembly may be activated in advance, reducing the time that the user spends on waiting the camera assembly to be activated after the page requiring the camera assembly to be activated is displayed.

In an operation S550, the first interface may be displayed, and the preview image collected by the camera assembly may be hidden.

Further, as the mobile terminal continues displaying the first interface, the preview image collected by the camera assembly may be hidden, so as to ensure the first interface to be displayed normally before the mobile terminal switches to the next interface, and to display the preview image collected by the camera assembly rapidly after the mobile terminal switches into the next interface.

According to the present disclosure, the method for controlling the terminal may be provided. The mobile terminal may display the first interface, acquire the interface information of the first interface, and determine the second interface based on the interface information of the first interface. The second interface may be the next interface following the first interface and forecasted by the mobile terminal. The mobile terminal may determine whether the function supported by the second interface requires the camera assembly to be activated. In response to the function supported by the second interface requiring the camera assembly to be activated, the mobile terminal may control the camera assembly to move out of the terminal body and activate the camera assembly. The mobile terminal may display the first interface and hide the preview image collected by the camera assembly. Compared to the method for controlling the terminal shown in FIG. 7, the camera may be controlled to move out of the terminal body and activated at the same time, reducing the time spent on waiting for the camera assembly being activated, improving the user experience.

As shown in FIG. 15, FIG. 15 is a diagram of an apparatus for controlling a terminal according to an embodiment of the present disclosure. The apparatus 200 for controlling the terminal may be applied to the above-mentioned mobile terminal. The diagram shown in FIG. 15 will be illustrated hereinafter. The apparatus 200 for controlling the terminal may include: an acquisition module 210, a first determination module 220, a second determination module 230, and a controlling module 240.

The acquisition module 210 may be configured for the mobile terminal to display a first interface and acquire interface information of the first interface.

The first determination module 220 may be configured to determine a second interface based on the interface information of the first interface, and the second interface may be a next interface following the first interface and forecasted by the mobile terminal. Further, the first determination module 220 may include: a historical data acquisition sub-module, a switching frequency acquisition sub-module, and a second interface determination module.

The historical data acquisition sub-module may be configured to acquire historical data of at least one next interface switched from the first interface.

The switching frequency acquisition sub-module may be configured to acquire a next interface having a highest switching frequency (i.e. a highest frequency of being switched from the first interface) from the at least one next interface based on the historical data.

The second interface determination sub-module may be configured to determine the next interface having the highest frequency of being switched from the first interface to be the second interface.

The second determination module 230 may be configured to determine whether a function supported by the second interface requires the camera assembly to be activated. Further, the second determination module 230 may include a determination sub-module.

The determination sub-module may be configured to determine whether the interface information of the first interface includes a target functional element. The camera assembly may be required to be activated while the target functional element is being triggered.

The controlling module 240 may be configured to control the camera assembly to move out of the terminal body, in response to the function supported by the second interface requiring the camera assembly to be activated. Further, the camera assembly may include a front camera and a rear camera. The controlling module 240 may include: a camera determination sub-module and a camera activation sub-module.

The camera determination sub-module may be configured to determine which of the front camera and the rear camera corresponds to the function supported by the second interface based on the function supported by the second interface, in response to the function supported by the second interface requiring the camera assembly to be activated.

The camera activation sub-module may be configured to activate the front camera or the rear camera correspondingly based on the camera.

Further, the controlling module 240 may further include: a requirement determination sub-module and a controlling sub-module.

The requirement determination may be configured to determine that the function supported by the second interface requires the camera assembly to be activated in response to the interface information of the first interface including the target functional element.

The controlling sub-module may be configured to control the camera assembly to move out of the terminal body.

Further, the controlling module 240 may include a camera activation sub-module and a preview image hidden sub-module.

The camera activation sub-module may be configured to control the camera assembly to move out of the terminal body and activate the camera assembly in response to the function supported by the second interface requiring the camera assembly to be activated.

The preview image hidden sub-module may be configured to display the first interface and hide the preview image collected by the camera assembly.

Further, the apparatus 200 for controlling the terminal may further include: a detection module, an activation module, and a retracting module.

The detection module may be configured to detect a touch operation performed on the first interface.

The activation module may be configured to activate the camera assembly and display the preview image collected by the camera assembly on the second interface in response to the touch operation performed on the target functional element of the first interface being detected.

The retracting module may be configured to control the camera assembly to be retracted to an inside of the terminal body in response to the touch operation performed on a region out of the target functional element of the first interface.

The retracting module may further be configured to control the camera assembly to be retracted to the inside of the terminal body in response to the touch operation performed on the target functional element of the first interface being not detected within a predefined time period.

The ordinary skilled person in the art should understand that, in order to provide a precise description, detailed processes of how the above apparatus and modules work may refer to corresponding processes as described in the above method embodiments, which will not be repeatedly described hereinafter.

In the embodiments of the present disclosure, a plurality of modules may be electrically coupled with each other, mechanically coupled with each other, or coupled with each other in other manners.

Further, various functional modules of the present disclosure may be integrated into one processing module or may be physically separated from each other. Alternatively, two or more modules may be integrated into one module. The integrated module may be shown as a hardware structure or may be achieved in a form of a software functional module.

The apparatus for controlling the terminal provided by the embodiments of the present disclosure may include the acquisition module, the determination module, the judgment module, and the control module. The acquisition module may be configured for the mobile terminal to display the first interface and acquire the interface information of the first interface. The determination module may be configured to determine the second interface based on the interface information of the first interface, and the second interface is the next interface following the first interface and forecasted by the mobile terminal. The judging module may be configured to determine whether the function supported by the second interface requires the camera assembly to be activated. The control module may be configured to control the camera assembly to move out of the terminal body in response to the function supported by the second interface requiring the camera assembly to be activated. In this way, the next interface to be displayed may be acquired based on the first interface. The camera assembly may be controlled to rise in advance in response to the function supported by the next interface requiring the camera assembly to be activated. The time spent on waiting the camera assembly to rise may be reduced, and the operation may be performed rapidly and easily.

As shown in FIG. 16, FIG. 16 is a diagram of a mobile terminal 100 configured to perform a method for controlling the terminal according to an embodiment of the present disclosure. The mobile terminal 100 may be a mobile terminal able to execute applications, such as a smart phone, a tablet computer, an electronic book, and so on. The mobile terminal 100 of the present disclosure may include one or more of the following components: a processor 110, a non-transitory memory 120, and one or more applications. The one or more applications may be stored in the non-transitory memory 120 and executed by one or more processors 110. The one or more applications may be configured to execute the method as described in the above embodiments.

The processor 110 may include one or more processing cores. The processor 110 may use various interfaces and lines to connect various components of the mobile terminal 100. The processor 110 may execute various functions of the mobile terminal 100 and process data by running or executing an instruction, a program, a code or a code set stored in the non-transitory memory 120 and by invoking data stored in the non-transitory memory 120. Alternatively, the processor 110 may be achieved in at least one hardware form of a digital signal processing (DSP), a field programmable gate array (Field-Programmable Gate Array, FPGA), and a programmable logic array (Programmable Logic Array, PLA). The processor 110 may integrate one of or a combination of a central processing unit (CPU), a graphics processing unit (GPU), and a modem. The CPU may be configured to process an operating system, a user interface, an application, and so on. The GPU may be configured to render or draw contents to be displayed. The modem may be configured to process wireless communication. It should be understood that, the modem may not be integrated into the processor 110, and may be configured as a communication chip.

The non-transitory memory 120 may include a random access memory (RAM) or a read-only memory (ROM). The non-transitory memory 120 may be configured to store an instruction for achieving the operating system, an instruction for achieving at least one function (such as the touch-operation function, an audio playing function, an image displaying function, and so on), or an instruction for achieving the method embodiments, and so on. A data storage area may store data generated while the mobile terminal 100 is being used (such as a contact list, audio and video data, chat record data), and so on.

Figure 17:
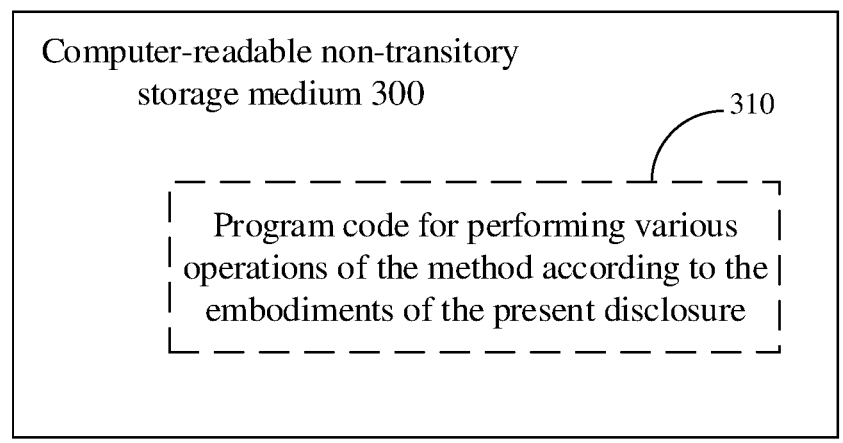
FIG. 17 is a storage unit configured to store or carry a program code for implementing a method for controlling the terminal according to an embodiment of the present application.

As shown in FIG. 17, FIG. 17 shows a structural diagram of a computer-readable non-transitory storage medium 300 according to an embodiment of the present disclosure. The computer-readable non-transitory storage medium 300 stores a program code, and the program code may be invoked by the processor to perform the methods as described in the above embodiments.

The computer-readable non-transitory storage medium 300 may be an electronic non-transitory memory, such as a flash memory, an electrically erasable programmable read only memory (EEPROM), an electrically programmable read only memory (EPROM), a hard control, or a ROM. Alternatively, the computer-readable non-transitory storage medium 300 may include a non-volatile computer-readable non-transitory storage medium. The computer-readable non-transitory storage medium 300 may have a storage area for storing a program code 310, which may be executed to perform any method or operation as described in the above embodiment. The program code may be read from one or more computer program products or written into the one or more computer program products. The program code 310 may be, for example, compressed in a proper manner.

In summary, embodiments of the present disclosure may provide a method for controlling the terminal, an apparatus for controlling the terminal, a mobile terminal, and a non-transitory storage medium. The mobile terminal may display a first interface, acquire interface information of the first interface, and determine a second interface based on the interface information of the first interface. The second interface may be a next interface following the first interface and forecasted by the mobile terminal. The mobile terminal may determine whether a function supported by the second interface requires the camera assembly to be activated. The mobile terminal may control the camera assembly to move out of the terminal body in response to the function supported by the second interface requiring the camera assembly to be activated. In this way, a next interface may be acquired based on the first interface, and the camera assembly may be controlled to rise in advance in response to the function supported by the next interface requiring the camera assembly to be activated, such that the time spent on waiting the camera to rise may be reduced, and the activation of camera assembly may be performed rapidly and easily.

It should be noted that, the above embodiments only illustrate, but do not limit, the technical solutions of the present disclosure. Although the present disclosure is described in details with reference to the foregoing embodiments, any ordinary skilled person in the art should understand that they may modify the technical solutions described in the foregoing embodiments, or equivalently replace some of the technical features. The modification or replacement do not cause the essence of the corresponding technical solutions to depart from the spirit and the scope of the technical solutions of the embodiments of the disclosure.

What is claimed is:

1. A method for controlling a mobile terminal, wherein the mobile terminal comprises a terminal body and a camera assembly, the camera assembly is disposed inside the terminal body and is movable relative to the terminal body to move out of the terminal body, and the method comprises:

displaying, by the mobile terminal, a first interface, and acquiring interface information of the first interface;

determining a second interface based on the interface information of the first interface, wherein the second interface is a next interface following the first interface and forecasted by the mobile terminal;

determining whether a function supported by the second interface requires the camera assembly to be activated; and controlling the camera assembly to move out of the terminal body in response to the function supported by the second interface requiring the camera assembly to be activated.

2. The method for controlling the mobile terminal according to claim 1, wherein after the determining a second interface based on the interface information of the first interface, the method further comprises:

determining a third interface based on interface information of the second interface, wherein the third interface is a next interface following the second interface and forecasted by the mobile terminal;

determining whether a function supported by the third interface requires the camera assembly to be activated; and controlling the camera assembly to move out of the terminal body in response to the function supported by the third interface requiring the camera assembly to be activated.

3. The method for controlling the mobile terminal according to claim 1, wherein the camera assembly comprises a front camera and a rear camera, and the method comprises:

determining which of the front camera and the rear camera corresponds to the function supported by the second interface based on the function supported by the second interface, in response to the function supported by the second interface requiring the camera assembly to be activated; and activating the front camera or the rear camera correspondingly based on the camera determined as corresponding to the function supported by the second interface.

4. The method for controlling the mobile terminal according to claim 1, wherein the determining a second interface based on the interface information of the first interface, comprises:

acquiring historical data of at least one next interface switched from the first interface;

obtaining a next interface having a highest switching frequency from the at least one next interface based on the historical data; and determining the next interface having the highest switching frequency as the second interface, wherein the switching frequency is a frequency of the next interface being switched from the first interface.

5. The method for controlling the mobile terminal according to claim 4, wherein after the acquiring historical data of the mobile terminal switching from the first interface into at least one next interface, the method further comprises:

obtaining a next interface having a highest number of times of being switched from the at least one next interface based on the historical data; and determining the next interface having the highest number of times as the second interface, wherein the number of times of being switched is the number of times of the next interface being switched from the first interface.

6. The method for controlling the mobile terminal according to claim 4, wherein the acquiring historical data of at least one next interface switched from the first interface, comprises:

acquiring an account currently logged on the mobile terminal; and acquiring the historical data of the at least one next interface switched from the first interface based on a record of the account.

7. The method for controlling the mobile terminal according to claim 1, wherein the determining whether a function supported by the second interface requires the camera assembly to be activated, comprises:

determining whether a target functional element is comprised in the interface information of the first interface, wherein the camera assembly is required to be activated in response to the target functional element being triggered; and the controlling the camera assembly to move out of the terminal body in response to the function supported by the second interface requiring the camera assembly to be activated, comprises:

determining that the function supported by the second interface requires the camera assembly to be activated in response to the target functional element being comprised in the interface information of the first interface; and controlling the camera assembly to move out of the terminal body.

8. The method for controlling the mobile terminal according to claim 7, wherein after the controlling the camera assembly to move out of the terminal body, the method further comprises:

detecting a touch operation performed on the first interface;

activating the camera assembly and displaying a preview image collected by the camera assembly on the second interface, in response to the touch operation performed on the target functional element being detected.

9. The method for controlling the mobile terminal according to claim 8, further comprising:

retracting the camera assembly in the terminal body, in response to the touch operation detected as being performed on a region out of the target functional element of the first interface.

10. The method for controlling the mobile terminal according to claim 8, further comprising:

retracting the camera assembly in the terminal body, in response to the touch operation performed on the target functional element being not detected within a predefined time period.

11. The method for controlling the mobile terminal according to claim 7, wherein the target functional element comprises at least one of a widget or a link.

12. The method for controlling the mobile terminal according to claim 1, wherein the determining whether a function supported by the second interface requires the camera assembly to be activated, comprises:

reading a mapping relation table locally from the mobile terminal, wherein the mapping relation table comprises a mapping relation between the camera assembly and various functions; and determining whether the function supported by the second interface requires the camera assembly to be activated based on the mapping relation table.

13. The method for controlling the mobile terminal according to claim 1, wherein the controlling the camera assembly to move out of the terminal body in response to the function supported by the second interface requiring the camera assembly to be activated, comprises:
controlling the camera assembly to move out of the terminal body and activating the camera assembly, in response to the function supported by the second interface requiring the camera assembly to be activated; and
displaying the first interface and hiding a preview image collected by the camera assembly.

14. The method for controlling the mobile terminal according to claim 13, wherein after the displaying the first interface and hiding the preview image collected by the camera assembly, the method further comprises:
displaying the preview image collected by the camera assembly in response to switching from the first interface into the second interface.

15. The method for controlling the mobile terminal according to claim 1, wherein the controlling the camera assembly to move out of the terminal body in response to the function supported by the second interface requiring the camera assembly to be activated, comprises:
controlling the camera assembly to move out of the terminal body in response to the function supported by the second interface comprising a scanning function and/or a photographing function.

16. The method for controlling the mobile terminal according to claim 1, wherein the interface information comprises at least one of text information, image information, a widget, or a link.

17. A control apparatus, applied in a mobile terminal, wherein the mobile terminal comprises a terminal body and a camera assembly, the camera assembly is disposed inside the terminal body and is movable relative to the terminal body to be exposed out of the terminal body, and the apparatus comprises:
an acquisition module, configured for the mobile terminal to display a first interface, and acquire interface information of the first interface;
a first determination module, configured to determine a second interface based on the interface information of the first interface, wherein the second interface is a next interface following the first interface and forecasted by the mobile terminal;
a second determination module, configured to determine whether a function supported by the second interface requires the camera assembly to be activated; and
a controlling module, configured to control the camera assembly to move out of the terminal body in response to the function supported by the second interface requiring the camera assembly to be activated.

18. The apparatus according to claim 17, wherein the camera assembly comprises a front camera and a rear camera, and controlling module comprises:
a camera determination module, configured to determine which of the front camera and the rear camera corresponds to the function supported by the second interface based on the function supported by the second interface in response to the function supported by the second interface requiring the camera assembly to be activated; and
a camera activation module, configured to activate the front camera or the rear camera correspondingly based on the camera determined as corresponding to the function supported by the second interface.

19. The apparatus according to claim 17, wherein the determination module comprises:
a historical data acquisition sub-module, configured to acquire historical data of each of at least one next interface switched from the first interface;
a switching frequency acquisition sub-module, configured to select a next interface having a highest switching frequency from the at least one next interface based on the historical data, wherein the highest switching frequency is a highest frequency of the next interface being switched from the first interface; and
a second interface determination module, configured to determine the next interface having the highest switching frequency to be the second interface.

20. A mobile terminal, comprising a terminal body and a camera assembly, wherein the terminal body comprises a non-transitory memory and a processor, the camera assembly and the non-transitory memory are coupled to the processor, the non-transitory memory is configured to store an instruction, and the instruction is executed by the processor to perform operations of:
displaying, by the mobile terminal, a first interface, acquiring interface information of the first interface;
determining a second interface based on the interface information of the first interface, wherein the second interface is a next interface following the first interface and forecasted by the mobile terminal;
determining whether a function supported by the second interface requires the camera assembly to be activated; and
controlling the camera assembly to move out of the terminal body in response to the function supported by the second interface requiring the camera assembly to be activated.

* * * * *